(12) United States Patent
Tachino et al.

(10) Patent No.: US 7,656,760 B2
(45) Date of Patent: Feb. 2, 2010

(54) PLAYBACK APPARATUS AND SYNC SIGNAL DETECTING METHOD

(75) Inventors: Ryuya Tachino, Kanagawa (JP); Kenichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 11/757,082

(22) Filed: Jun. 1, 2007

(65) Prior Publication Data

US 2007/0280078 A1 Dec. 6, 2007

(30) Foreign Application Priority Data

Jun. 2, 2006 (JP) .............................. 2006-154747

(51) Int. Cl.
*G11B 5/09* (2006.01)
(52) U.S. Cl. .............. 369/47.48; 369/47.28; 369/59.19; 369/59.23
(58) Field of Classification Search ........................ None
See application file for complete search history.

(56) References Cited

U.S. PATENT DOCUMENTS

| 5,677,935 | A | 10/1997 | Karino |
| 7,266,386 | B2 | 9/2007 | Kim et al. |
| 2002/0037080 | A1* | 3/2002 | Katayama et al. ........... 380/267 |
| 2003/0081524 | A1* | 5/2003 | Wada et al. ............... 369/59.21 |
| 2004/0151105 | A1* | 8/2004 | Aida et al. ................ 369/59.24 |

FOREIGN PATENT DOCUMENTS

| JP | 2001-243727 | 9/2001 |
| JP | 3377669 | 12/2002 |
| JP | 2004-336782 | 11/2004 |
| JP | 3697809 | 7/2005 |
| JP | 2006-74790 | 3/2006 |

OTHER PUBLICATIONS

C. Perkins, et al. "Ad hoc On-Demand Distance Vector (AODV) Routing", RFC 3561, Network Working Group, IETF (http://www.ieft.org/rfc/rfc3561.txt) Jul. 2003, pp. 1-31.

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A playback apparatus plays back information from a recording medium having a data structure including sync signals added in units of data items each having a predetermined size. The information is recorded in runlength limited codes, and the signals correspond to consecutive unique run lengths. The apparatus includes an information reading unit that obtains a binary data string as read information by reading the medium, a sync detection unit that performs detection of sync signals from the data string, and a data demodulation unit that obtains played-back data from the medium by performing demodulation on the data string with timing based on the detected signals. On the basis of detection, from the data string, of one detection pattern among types of detection patterns set as patterns including at least one of the unique run lengths, the sync detection unit regards the pattern detection as the signal detection.

9 Claims, 17 Drawing Sheets

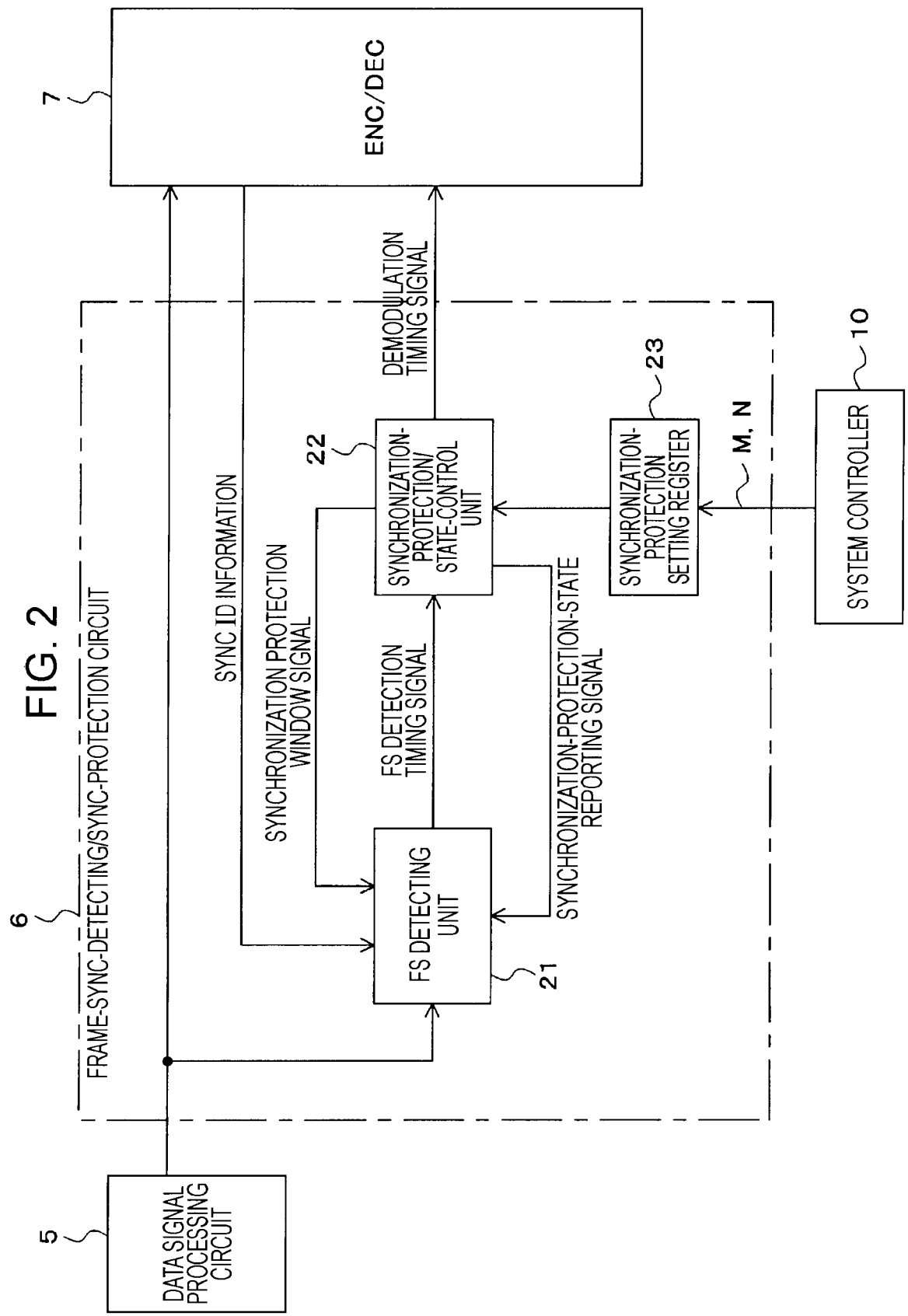

FIG. 3A

| SYNC NUMBER | 24-BIT SYNC BODY | 6-BIT SYNC ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |

FIG. 3B

| SYNC NUMBER | 24-BIT SYNC BODY | 6-BIT SYNC ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 100 101 |
| FS8 | #01 010 000 000 010 000 000 010 | 101 010 |

FIG. 5A

| FRAME NUMBER | FRAME SYNC | FRAME NUMBER | FRAME SYNC |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

FIG. 5B

| FRAME NUMBER | FRAME SYNC | FRAME NUMBER | FRAME SYNC |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |
| | | LINK FRAME 1 | FS7 |
| | | LINK FRAME 2 | FS8 |

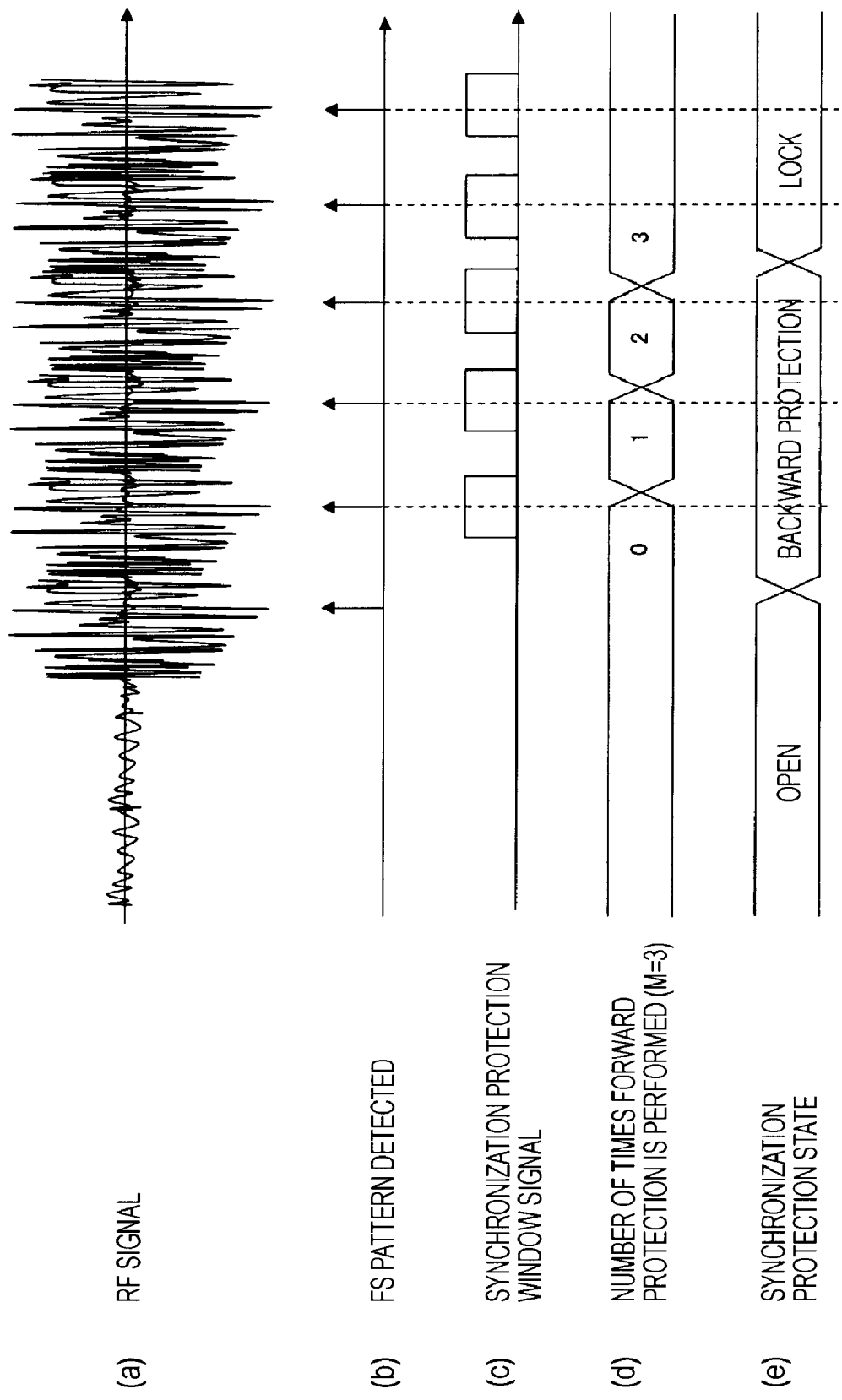

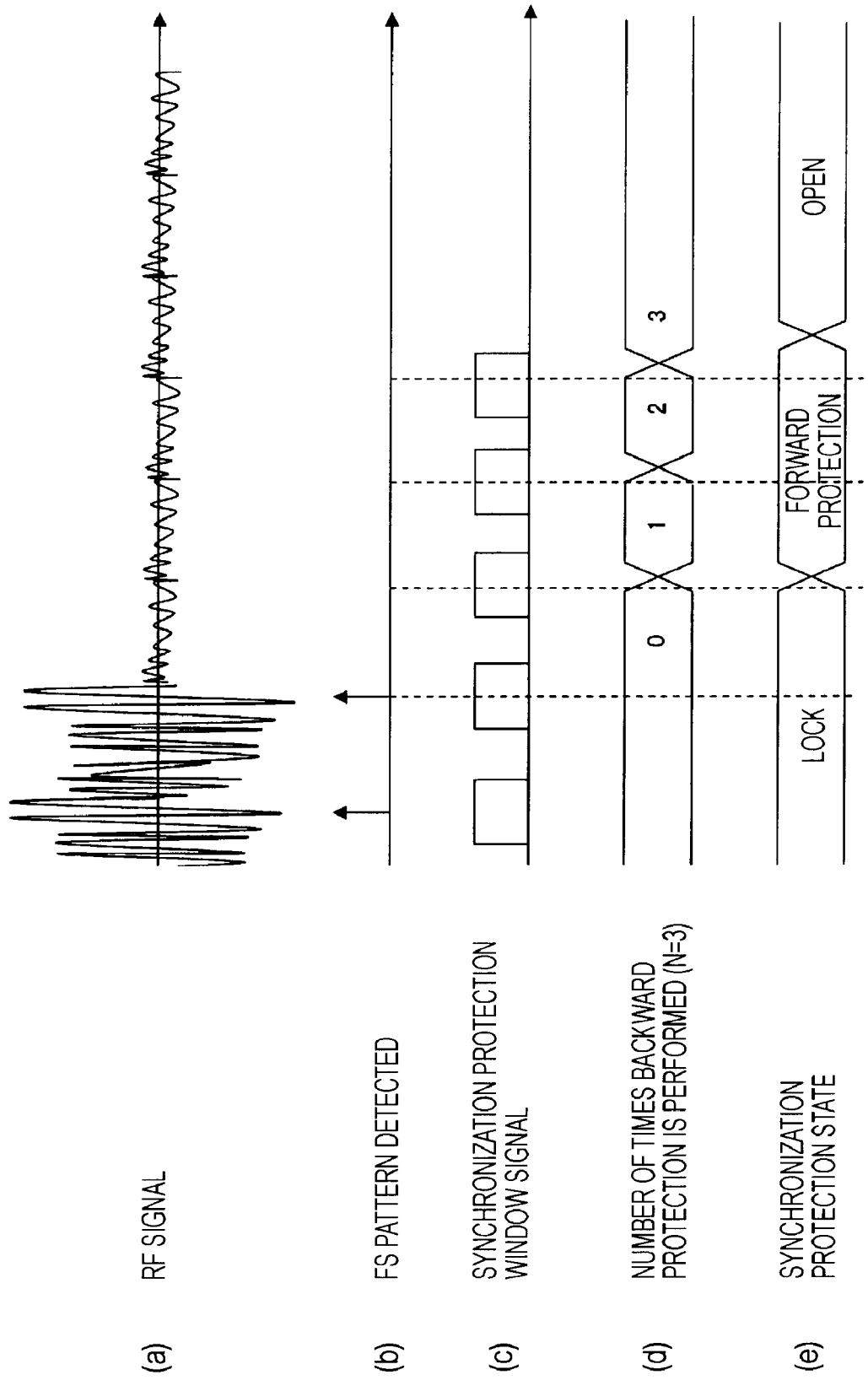

FIG. 9

| NAME OF DETECTION PATTERN | COMBINATION OF RUN LENGTHS | SECURITY LEVEL | SYNCHRONIZATION PROTECTION STATE | | DETECTION PATTERN (NRZ) |
|---|---|---|---|---|---|
| | | | OPEN/ BACKWARD PROTECTION | LOCK/ FORWARD PROTECTION | |
| P1 | 2T9T9T | LEVEL 1 | USEABLE | USEABLE | 10100000001000000001 |
| P2 | 2T9TuTvTwT+FSID (u, w≥2) | LEVEL 2 | NOT USEABLE | USEABLE | 10100000000100xxx0010 FSID |
| P3 | 2TuTvTwT9T+FSID (u, w≥2) | LEVEL 2 | NOT USEABLE | USEABLE | 10100xxx0010000000010 FSID |
| P4 | 2T9TuTvTwT+FSID | LEVEL 3 | NOT USEABLE | USEABLE | 10100000001xxxxxx10 FSID |
| P5 | 2TuTvTwT9T+FSID | LEVEL 3 | NOT USEABLE | USEABLE | 101xxxxxx10000000010 FSID |
| P6 | 2T9TuTvTwT (u, w≥2) | LEVEL 4 | USEABLE | USEABLE | 10100000000100xxx001 |
| P7 | 2TuTvTwT9T (u, w≥2) | LEVEL 4 | USEABLE | USEABLE | 10100xxx001000000001 |
| P8 | 2T9TuTvTwT (w≥2) | LEVEL 5 | USEABLE | USEABLE | 10100000001xxxxx001 |
| P9 | 2TuTvTwT9T (w≥2) | LEVEL 5 | USEABLE | USEABLE | 101xxxxx001000000001 |
| P10 | 2T9TuTvTwT | LEVEL 6 | USEABLE | USEABLE | 10100000001xxxxxx1 |
| P11 | 2TuTvTwT9T | LEVEL 6 | USEABLE | USEABLE | 101xxxxxx1000000001 |

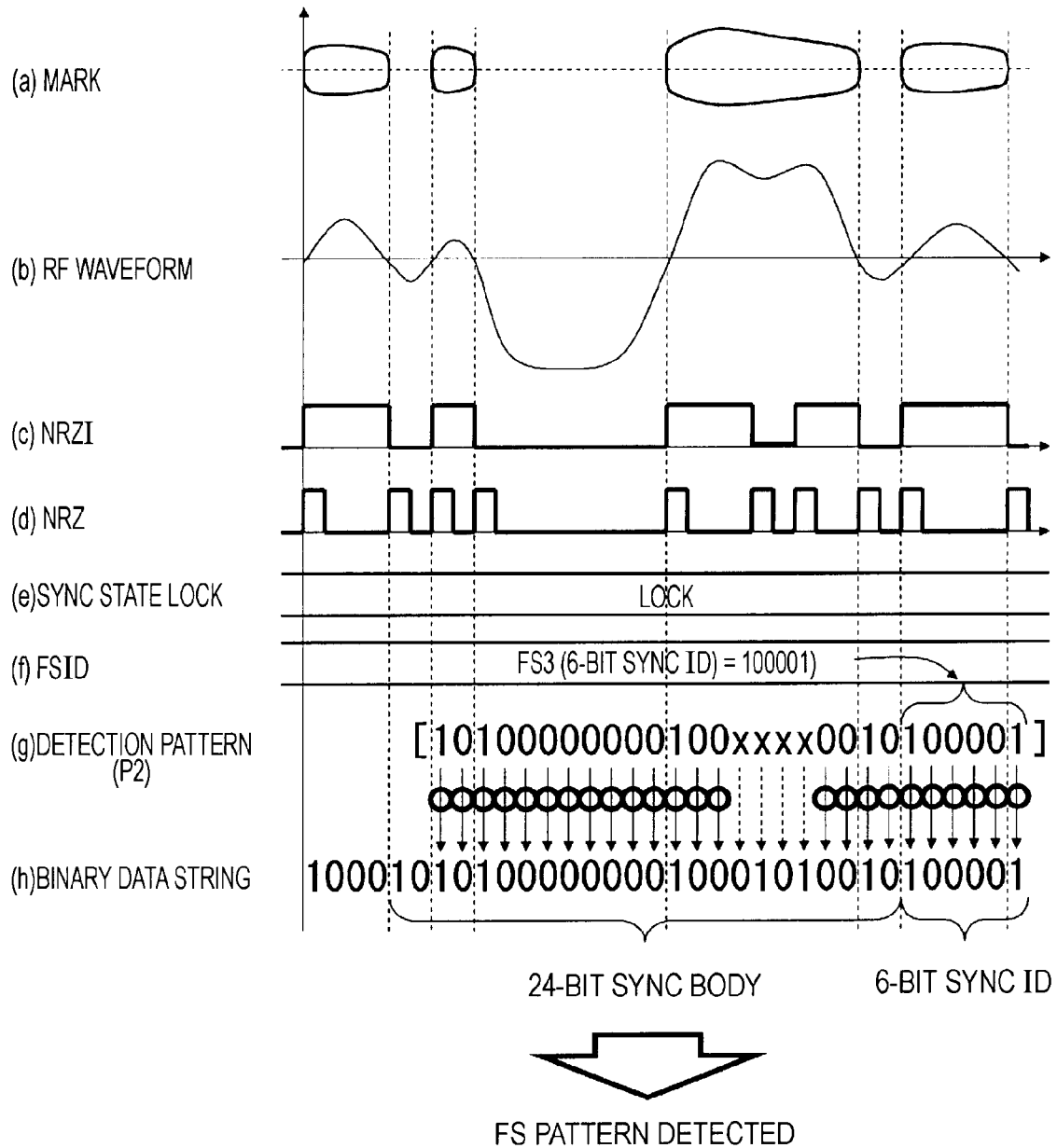

PLAYBACK APPARATUS AND SYNC SIGNAL DETECTING METHOD

CROSS REFERENCES TO RELATED APPLICATIONS

The present invention contains subject matter related to Japanese Patent Application JP 2006-154747 filed in the Japanese Patent Office on Jun. 2, 2006, the entire contents of which are incorporated herein by reference.

BACKGROUND OF THE INVENTION

1. Field of the Invention

The present invention relates to a playback apparatus for playing back information from a recording medium in which, in a data structure including sync signals added in units of data items each having a predetermined size, the information is recorded in runlength limited codes, and the sync signals correspond to a plurality of consecutive sync-signal-unique run lengths, and to a sync signal detecting method therefor.

2. Description of the Related Art

Examples of the related art are disclosed in Japanese Unexamined Patent Application Publication No. 2001-243727, and Japanese Patent Nos. 3697809 and 3377669.

Technologies for recording and playing back digital data include, for example, data recording technologies in which optical discs, such as a CD (compact disc) and a DVD (digital versatile disc), are used as recording media.

Optical discs include playback-only types which are known as a CD, a CD-ROM (CD read-only memory), a DVD-ROM (DVD read-only memory), etc., and in which information is recorded in embossed pits, and user-data-recordable types known as a CD-R (CD recordable), a CD-RW (CD rewritable), a DVD-R (DVD recordable), a DVD-RW (DVD rewritable), a DVD+RW, and a DVD-RAM (DVD random access memory). In the recordable types, data can be recorded by using magneto-optical recording, phase-change recording, pigment-film-change recording. The pigment-film-change recording is also called "write-once recording". The pigment-film-change recording is suitable for uses such as data storage since data can be recorded only once and may not be rewritten. In addition, the magneto-optical recording and the phase-change recording, data can be rewritten. Accordingly, both are used for various uses such as recording of content data of various types such as music, video, and application programs.

Furthermore, in recent years, a high-density optical disc, called a "Blu-ray Disc™", has been developed, and has a greatly large storage capacity.

On the above optical discs, information is recorded in forms such as embossed pits, pigment-change marks, and phase-change marks. In the following description, these marks are generically referred to as "marks", including the embossed pits. In many cases, marks on the discs are formed on the basis of signals obtained by modulating the original data (to be recorded) into runlength limited codes.

Recording formats of the discs employ a data structure in which sync signals are added in units of predetermined data items. Accordingly, by detecting a sync signal, timing for demodulating data and an address can be obtained.

SUMMARY OF THE INVENTION

A recording format of the Blu-ray Disc is described below as an example. In the case of the Blu-ray Disc, frame sync patterns are added as sync signals in units of data items called "frames" each having 1932 bits. Data based on runlength limited codes is represented by 2T to 8T, where T represents a channel clock period. A frame sync pattern has consecutive 9T's as unique run lengths that are not included in a limitation of 2T to 8T.

In a playback mode, a frame sync pattern is detected from a binary data string obtained by binarizing a signal read from a string of marks and spaces recorded on the disc. On the basis of timing information of the detection, a demodulation circuit unit at a subsequent stage demodulates data from the binary data string and performs address decoding.

For frame-sync-pattern detection, a unique pattern (unique runlength pattern) in a frame sync pattern defined in the recording format of the Blu-ray Disc is detected by performing pattern matching. In the case of the Blu-ray Disc, as described above, the unique pattern in the frame sync pattern has two consecutive unique run lengths 9T's, which are represented by "9T9T".

The marks on the disc are recorded as data on the basis of an NRZI (non-return-to-zero-inverted) data string. In a binary data string converted into an NRZ (non-return-to-zero) form, 9T9T is a pattern represented by "1000000001000000001".

In frame-sync-pattern detection, either run length in the unique pattern may be broken due to a disturbance. For example, when a unique run length is represented by nT, for an expected frame sync pattern is represented by nTnT, "uTvTwTnT" or "nTuTvTwT" may appear as a frame sync pattern broken due to a disturbance, where u+v+w=n.

Since, in the case of the Blu-ray Disc, n=9, an expected frame sync pattern is "9T9T". However, "uTvTwT9T" or "9TuTvTwT" may appear as a frame sync pattern, where u+v+w=9.

Specifically, a frame sync pattern that should be 9T9T may be broken into three run lengths, that is, "4T2T3T", thus resulting in "4T2T3T9T". The last 9T may be broken into three run lengths, that is, "2T5T2T", thus resulting in "9T2T5T2T".

In these cases, when nTnT (for example, n=9) is used as a detection pattern, no frame sync pattern can be detected. The examples of the related art cope with this case by performing processing such as interpolation of frame sync timing with a sync protection function.

For example, Japanese Unexamined Patent Application Publication No. 2001-243727, and Japanese Patent Nos. 3697809 and 3377669 describe a technology in which, when a different pattern exists at a position where a sync pattern should exist, by performing sync protecting processing, a sync pattern is regarded as existing, and a technology in which a sync pattern that slightly shifts in position (timing) is treated as a normal sync pattern.

In the examples of the related art, a normal sync pattern of, for example, nTnT, is basically detected. When the normal sync pattern is not partially obtained, by interpolating a sync pattern on the basis of a period in which the normal sync pattern is repeated, and, even if the normal sync pattern slightly shifts in timing, by allowing the shift and compensating for a synchronization pattern, sync detecting capability can be enhanced.

However, even if these are performed, in a case such as when a disturbance or the like slips a PLL (phase-locked loop) for generating a clock signal for use until the binary data string is generated, a shift occurs between demodulation timing for an interpolated frame sync pattern and an actual position of the frame, and causes demodulation of false data. Consequently, an error rates deteriorates, thus causing playback performance deterioration.

Furthermore, frame sync interpolation can cope with a local frame sync abnormal state caused by, for example, a scratch or dust on the disc. However, it is difficult for the frame sync interpolation to cope with a case in which frame sync patterns averagely break with fixed regularity. For example, when an optical disc having bad recorded signal quality is played back, frame sync patterns may averagely (continuously) break on binary data, as described above. In such a case, the period of a normal sync pattern can hardly be confirmed, and, in addition, it is difficult to interpolate frame sync timing on the basis of a repetition period.

Accordingly, it is desirable to ensure sync signal detection while considering various circumstances.

According to an embodiment of the present invention, there is provided a playback apparatus for playing back information from a recording medium having a data structure including sync signals added in units of data items each having a predetermined size, the information being recorded in runlength limited codes, the sync signals corresponding to a plurality of patterns of consecutive unique run lengths unique to the sync signals. The playback apparatus includes an information reading unit that obtains a binary data string as read information by reading the recording medium, a sync detection unit that performs detection of sync signals from the binary data string, and a data demodulation unit that obtains played-back data from the recording medium by performing demodulation on the binary data string with timing based on the sync signals detected by the sync detection unit. On the basis of detection, from the binary data string, of one detection pattern among a plurality of types of detection patterns set as patterns including at least one of the plurality of patterns of consecutive unique run lengths, the sync detection unit regards the detection of the detection pattern as the detection of the sync signals.

When the detected sync signals correspond to two consecutive unique run lengths among the plurality of patterns of consecutive unique run lengths, the plurality of types of detection patterns may include a detection pattern in which one of the two consecutive unique run lengths is not one of the plurality of patterns of consecutive unique run lengths.

When one of the plurality of patterns of consecutive unique run lengths is represented by nT and the detected sync signals correspond to a pattern represented by nTnT, where T represents a channel clock period, the plurality of types of detection patterns may include a pattern represented by nTuTvTwT and a pattern represented by uTvTwTnT, where u+v+w=n.

When information of run lengths represented by 2T to 8T as the runlength limited codes is recorded on the recording medium, and the detected sync signals correspond to a pattern of unique run lengths represented by 9T9T, where T represents a channel clock period, the plurality of types of detection patterns may include a pattern represented by 9TuTvTwT and a pattern represented by uTvTwT9T, where u+v+w=9.

The information reading unit may obtain the binary data string by performing partial response maximum likelihood decoding on a signal obtained by reading the recording medium.

The sync detection unit may select a detection pattern for use in sync signal detection from the plurality of types of detection patterns.

The sync signals and sync identification information representing sync signal types may be added to all or part of the units of data items on the recording medium, and the plurality of types of detection patterns used by the sync detection unit may include patterns including the sync identification information.

On the basis of a synchronization protection state in sync signal detection, the sync detection unit may select whether to use, among the plurality of types of detection patterns, the patterns including the sync identification information for sync signal detection.

According to another embodiment of the present invention, a playback method is provided which includes the steps of comparing a pattern appearing in a binary data string obtained by reading a recording medium with each of a plurality of types of detection patterns set as patterns including at least one of a plurality of patterns of consecutive unique run lengths, and, when matching occurs between the pattern appearing in the binary data string and at least one of the plurality of types of detection patterns, regarding the matching as sync signal detection.

In other words, an embodiment of the present invention is based on an idea that, in a case in which, at a position where a pattern of consecutive unique run lengths as a sync signal should exist, not only a normal pattern for the sync signal, but also a fixed error pattern that has a fixed error exists, the fixed error pattern is treated as a correct sync signal pattern. The fixed error pattern corresponds to one of a plurality of types of detection patterns set as patterns including at least one of the consecutive unique run lengths. For example, a pattern having two consecutive unique run lengths is a normal sync signal pattern, a pattern in which one of the two consecutive unique run lengths breaks is also regarded as a normal sync signal pattern for processing.

More specifically, when a unique run length is represented by nT, and the original sync signal pattern is represented by nTnT, a pattern in which one unique run length (nT) breaks is represented by nTuTvTwT or uTvTwTnT.

In this case, "u", "v", and "w" have a relationship represented by u+v+w=n, and represent run lengths of T's when nT breaks into three run lengths. "u", "v", and "w" may be different numerical values, and may be identical numerical values.

For example, when n=9, "u", "v", and "w" represent combinations of numerical values in which u+v+w=9. Actually, a combination of "u", "v", and "w" may be a combination of "4", "2", and "3", a combination of "3", "3", and "3", and a combination of "2", "5", and "2".

In addition, "units of data items" represent units in which sync signals, such as frame sync patterns, are added. The units of data items are not limited to units called "frames" in recording formats of various recording media. For example, even units of data items that are called "sectors", "data units", "clusters", "segments", etc., correspond to the "units of data items" in this specification if, in the units of data items, sync patterns to be detected are added.

According to an embodiment of the present invention, sync signal detecting capability can be improved, whereby stable data playback is realized. In particular, even in a case in which, in playback of a recording medium having bad recorded signal quality, sync signal patterns constantly break, sync timing can appropriately be detected, thus enabling stable data modulation.

BRIEF DESCRIPTION OF THE DRAWINGS

FIG. 2 is a block diagram showing the frame-sync-detecting/synchronization-protection circuit shown in FIG. 1;
FIGS. 3A and 3B are illustrations of frame sync patterns;
FIGS. 5A and 5B are illustrations of frame structures;

FIG. 7 has parts (a) to (e) illustrating an synchronization protecting operation in the embodiment of the present invention;

FIG. 8 has parts (a) to (e) illustrating an synchronization protecting operation in the embodiment of the present invention;

FIG. 9 is an illustration of detection patterns that are regarded as frame sync patterns in the embodiment of the present invention;

FIG. 17 has parts (a) to (h) illustrating an example of frame sync detection in the embodiment of the present invention.

DESCRIPTION OF THE PREFERRED EMBODIMENTS

A playback apparatus according to an embodiment of the present invention and a sync signal detecting method used therefor are described below by using an example of a disc drive apparatus for a Blu-ray Disc. The playback apparatus and the sync signal detecting method are described in the following order:

1. Configurations of Disc and Disc Drive Apparatus;
2. Frame-Sync Detection-and-synchronization-protection Circuit and Frame Sync Pattern
3. Synchronization-protection-state Transition; and
4. Frame Sync Detecting Operation 1. Configurations of Disc and Disc Drive Apparatus In the embodiment, the disc drive apparatus can play back and record a playback-only disc or recordable disc (a write-once disc or rewritable disc) corresponding to a Blu-ray Disc.

In the case of the recordable disc, under conditions having a combination of a laser having a wavelength of 405 nm and an objective lens having an NA (numerical aperture) of 0.85, phase change marks and pigment change marks are recorded and read. Recording and playback are performed at a track pitch of 0.32 μm and a line density of 0.12 μm/bit with a 64-KB data block used as one RUB (recording unit block).

In the case of a ROM (read-only memory) disc, playback-only data is recorded with embossed pits each having a depth of approximately λ/4. Similarly, a track pitch of 0.32 μm and a line density of 0.12 μm/bit are used. A 64-KB data block is used as one RUB.

The recording/playback unit, RUB, has a total of 498 frames that are generated, for an ECC (error-correcting code) block (cluster) having 156 symbols×496 frames, by adding one-frame link areas to, the start and end of the ECC block, as described later with reference to FIG. 5.

The recordable disc has a wobbled groove formed thereon. The wobbled groove forms recording/playback tracks. A wobbled form of the groove includes so-called "ADIP (address in pregroove)". In other words, by detecting wobbling information of the groove, an address on the disc can be obtained.

In the case of the recordable disc, recording marks are recorded as phase change marks on the tracks formed by the wobbled groove. The phase change marks are recorded at a line density of 0.12 μm/bit (0.08 μm/ch bit) by using the RLL (run length limited) (1,7) PP (Parity preserve/Prohibit rmtr (repeated minimum transition runlength) modulation method or the like.

When a channel clock period is represented by "T", a mark length is represented by 2T to 8T.

In the case of the playback-only disc, the groove is not formed. The playback-only disc contains, as embossed pit strings, data modulated by similarly using the PLL(1,7) PP modulation method.

Figure 1:
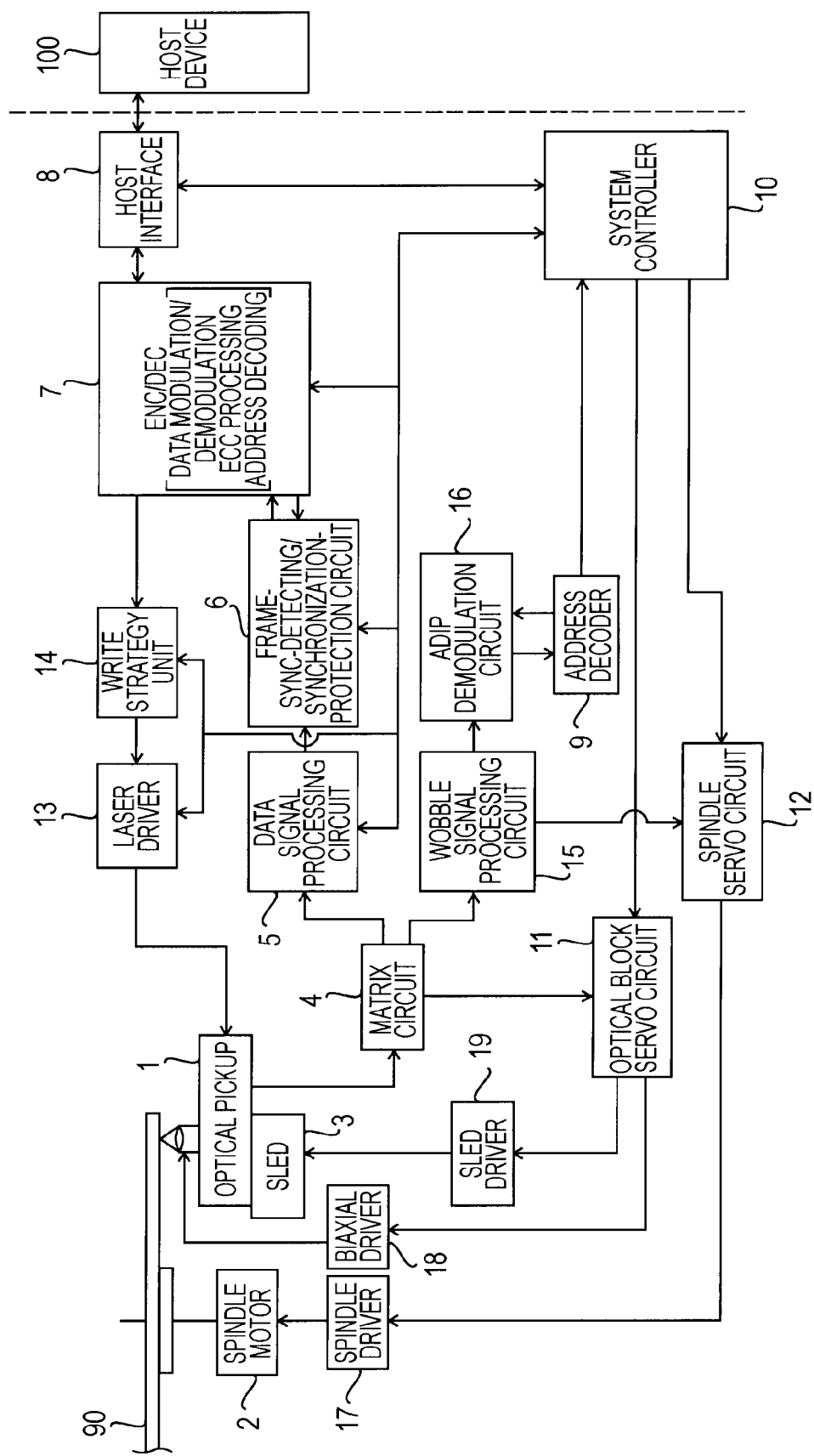
FIG. 1 is a block diagram showing a disc drive apparatus according to an embodiment of the present invention.

A disc drive apparatus that can record and play back the above-described discs is shown in FIG. 1.

In FIG. 1, a disc 90 is, for example, one of the above playback-only disc and the above recordable disc.

After being loaded into the disc drive apparatus, the disc 90 is stacked on a turntable (not shown), and the disc 90 is rotated at a CLV (constant linear velocity) by a spindle motor 2 in a recording or playback mode.

In the playback mode, an optical pickup (optical head) 1 reads information of marks on the tracks on the disc 90.

When the disc 90 is the recordable disc, in the recording mode, the optical pickup 1 records user data as phase change marks or pigment change marks on the disc 90.

Playback-only management information, for example, disc's physical information, etc., is recorded as embossed pits or wobbled groove on the disc 90. The recorded information is read by the optical pickup 1. When the disc 90 is the recordable disc, the optical pickup 1 also reads ADIP information embedded in the wobbled form of the tracks on the disc 90.

The optical pickup 1 includes a leaser diode that used as a laser source, a photo-detector for detecting a reflected beam, an objective lens unit that serves an output end for a laser beam, and an optical system which emits the laser beam to a recording surface of the disc 90 through the objective lens unit and which conducts a beam reflected therefrom to the photo-detector. The laser diode outputs, for example, a so-called "blue laser" having a wavelength of 405 nm. The optical system has an NA of 0.85.

In the optical pickup 1, the objective lens unit is supported by a biaxial mechanism so as to be moved in tracking and focusing directions.

The entirety of the optical pickup 1 can be moved by a sled mechanism 3 (indicated by "SLED" in FIG. 1) in a disc radial direction.

The laser diode in the optical pickup 1 is driven to emit the laser beam on the basis of a drive signal (current) from a laser driver 13.

The photo-detector detects and converts the reflected beam from the disc 90 into an electric signal based on the amount of the detected beam, and supplies the electric signal to a matrix circuit 4.

The matrix circuit 4 includes current-to-voltage conversion circuits and matrix-calculation/amplifier circuits corresponding to output currents from a plurality of photo-receiving elements used as the photo-detector.

The matrix circuit 4 generates, for example, an RF signal (played-back data signal) corresponding to played-back data, a focus error signal for servo control, and a tracking error signal, etc.

In addition, the matrix circuit 4 generates a signal related to the wobbled form of the groove, that is, a push-pull signal as a wobbling detection signal.

The matrix circuit 4 supplies the played-back data signal (RF signal) to a data signal processing circuit 5, supplies the focus-error and tracking error signals to an optical block servo circuit 11, and supplies the push-pull signal to the wobble signal processing circuit 15.

The data signal processing circuit 5 binarizes the played-back data signal, and supplies an obtained binary data string to a frame-sync-detecting/synchronization-protection circuit 6 at the subsequent stage.

Accordingly, the data signal processing circuit 5 performs an RF-signal analog-to-digital (A/D) conversion process, a PLL playback clock generating process, a PR (partial response) equalizing process, and a Viterbi decoding (maximum likelihood decoding) process. That is, by using a PRML (partial response maximum likelihood) decoding process (PRML detection method), a binary data string is obtained.

The PRML decoding process is briefly described below. In recent years, PRML detection has been widely employed for a playback method for optical discs. This is a method for detecting a partial response series in which an Euclidean distance of a signal read from a disc is the minimum, and is a technology that is a combination of a process of a partial response and a process of maximum likelihood detection.

A partial response series is obtained such that weighted addition defined by a target response is performed on a bit series. An optical disc system uses, for example, PR(1, 2, 2, 1) or the like. This indicates that values obtained by performing addition of the bit series, with weights of 1, 2, 2, and 1, are sent back as partial response values.

A partial response is a process in which, for an input of one bit, an output that is longer than one bit is sent back. PR(1, 2, 2, 1) represents a process in which, for an input of consecutive four bits, a signal, obtained by sequentially multiplying the four bits by 1, 2, 2, and 1, and adding the products, is obtained as the played-back signal.

Maximum likelihood detection is a method that includes defining a distance called a "Euclidean distance" between two signals, determining a distance between an actual signal and a signal predicted from an assumed bit series, and detecting a bit series in which the distance is the smallest, where the Euclidean distance is defined as a distance obtained such that the squares of amplitude differences, each between two signals at one time, are added for all times. In addition, Viterbi detection is used for searching for a bit series in which the Euclidean distance is the smallest.

In the PRML detection that is a combination of both, after a signal obtained from bit information of a recording medium is adjusted to be the partial response process by a filter called an "equalizer", a Euclidean distance between the obtained played-back signal and a partial response of an assumed bit series is determined, and a bit series in which the Euclidean distance is the smallest is detected.

To actually search for the bit series in which the Euclidean distance is the smallest, an algorithm based on the above-described Viterbi detection is effective.

In the Viterbi detection, a Viterbi detector is used. The Viterbi detector is configured by a plurality of states in units of consecutive bits having a predetermined length, and branches represented by transitions between the states. The Viterbi detector can efficiently detect a targeted bit series from all possible bit series.

An actual circuit of the Viterbi detector includes two registers, that is, one, called a "path metric register", for storing a Euclidean distance (path metric) between, for each state, a partial response series up to the state, and a signal, and another, called a "path memory register", for storing the flow (path memory) of a bit series up to the state. In addition, the Viterbi detector includes an arithmetic unit, called a "branch metric unit", for calculating, for each branch, a Euclidean distance between a partial response series at the bit and the signal.

The Viterbi detector can associate various bit series in one-to-one relationships by using each of paths passing through the above states. In addition, a Euclidean distance between a partial response series that pass through the paths and an actual signal is obtained by sequentially adding inter-state transitions (forming the paths), that is, the above branch metrics.

Selection of a path in which the Euclidean distance is the smallest is realized by sequentially selecting paths having smaller path metrics, while comparing the magnitudes of path metrics of two or less branches reached in each state. By transferring information of the selection to the path memory register, information representing paths reaching each state in a bit series form is stored. The value of the path memory register is sequentially updated and finally converges into a bit series in which the Euclidean distance is the smallest. Thus, the result is output. The above-described manner makes it possible to efficiently search for a bit series from which a partial response series having the smallest Euclidean distance to the played-back signal is generated.

The data signal processing circuit 5 uses the above-described PRML detection to output a binary data string as information read from the disc 90. The data signal processing circuit 5 decodes binary data as an NRZI (non-return-to-zero-inverted) series to generate an NRZ series, and supplies the NRZ (non-return-to-zero) series to the frame-sync-detecting/synchronization-protection circuit 6.

The frame-sync-detecting/synchronization-protection circuit 6 performs frame sync detection and sync protection (for stable frame sync detection) on the NRZ series as binary data output from the data signal processing circuit 5.

The configuration of the frame-sync-detecting/synchronization-protection circuit 6 is described later with reference to FIG. 2.

An ENC/DEC (encoder/decoder) 7 decodes the played-back data in the playback mode and modulates recording data in the recording mode. Specifically, in the playback mode, the ENC/DEC 7 performs de-interleaving, ECC decoding, address decoding, etc., and, in the recording mode, performs ECC decoding, interleaving, data modulation, etc.

In the playback mode, the binary data string obtained by the data signal processing circuit 5 and a decoding timing signal based on the frame sync detection by the frame-sync-detecting/synchronization-protection circuit 6 are supplied to the ENC/DEC 7. The ENC/DEC 7 obtains the played-back data from the disc 90 by decoding the binary data string with timing represented by the decoding timing signal based on the frame sync detection. Specifically, by decoding data that is recorded on the disc 90 with the RLL(1,7) PP modulation performed, and performing ECC decoding in which error correction is performed, the played-back data from the disc 90 is obtained.

The played-back data obtained by the ENC/DEC 7 is transferred to the host interface 8, and is transferred to the host device 100 on the basis of an instruction of the system controller 10. The host device 100 is, for example, one of a computer apparatus and an AV (audio-visual) system device.

When the disc 90 is the recordable disc, ADIP information is processed in the recording or playback mode.

In other words, the push-pull signal that is output as a signal related to the wobbled form of the groove from the matrix circuit 4 is converted into digitized wobble data by the wobble signal processing circuit 15. In addition, the PLL processing generates a clock signal synchronized with the push-pull signal.

An ADIP demodulation circuit 16 performs MSK (minimum shift keying) demodulation and STW (saw-tooth wobble) demodulation on the wobble data to generate a data stream that forms an ADIP address. The data stream is supplied to the address decoder 9.

The address decoder 9 obtains an address value by decoding the supplied data stream and supplies the address value to the system controller 10.

In the recording mode, recording data is transferred from the host device 100. The transferred recording data is supplied the ENC/DEC 7 through the host interface 8.

In this case, the ENC/DEC 7 performs, as recording data encoding, performs processing such as error-correcting-code addition (ECC encoding), interleaving, and subcode addition. The ENC/DEC 7 also performs RLL(1-7) PP modulation on the processed data.

The recording data processed by the ENC/DEC 7 is converted by the write strategy unit 14 into laser drive pulses. The laser drive pulses are obtained such that fine adjustment of optimal recording power for recording layer characteristics, laser beam spot shapes, recording linear velocity, etc., and laser drive pulse waveform adjustment, etc., are performed as recording compensating processing. The laser drive pulses are supplied to the laser driver 13.

The laser driver 13 allows the optical pickup 1 to execute laser emission driving by supplying the recording-compensated laser driver pulses to the laser diode in the optical pickup 1. This can form marks based on the recording data on the disc 90.

The laser driver 13 includes a so-called "APC (auto power control) circuit". Accordingly, the laser driver 13 controls a laser output to be constant regardless of a temperature or the like while monitoring laser output power on the basis of an output from a laser-power-monitoring detector in the optical pickup 1. Targeted laser output values in the recording and playback modes are given by the system controller 10. Laser output levels in the recording and playback modes are controlled to be the targeted laser output values.

The optical block servo circuit 11 allows execution of a servo operation by generating various (focusing, tracking, and sled) servo drive signals from the focus error signal and tracking error signal from the matrix circuit 4.

In other words, the optical pickup 1 generates a focus drive signal and a tracking drive signal on the basis of the focus error signal and the tracking error signal, and uses the biaxial driver 18 to drive a biaxial mechanism focus coil and tracking coil in the optical pickup 1. Accordingly, the optical pickup 1, the matrix circuit 4, the optical block servo circuit 11, the biaxial driver 18, and a tracking servo loop and focus servo loop based on the biaxial mechanism are formed.

The optical block servo circuit 11 also controls the optical pickup 1 to execute a track jump operation by turning off the tracking servo loop and outputting a jump drive signal on the basis of a track jump command from the system controller 10.

In addition, the optical block servo circuit 11 generates a sled drive signal on the basis of a sled error signal that is obtained as a low frequency component of the tracking error signal and access execution control by the system controller 10. The optical block servo circuit 11 uses a sled driver 19 to drive the sled mechanism 3. The sled mechanism 3 includes a main shaft for supporting the optical pickup 1, a sled motor, and transmission gears, which are not shown. In the sled mechanism 3, by driving the sled motor on the basis of the sled drive signal, a necessary slide movement of the optical pickup 1 can be performed.

A spindle servo circuit 12 controls the spindle motor 2 to perform CLV rotation.

The spindle servo circuit 12 generates a spindle error signal by obtaining, as a current rotation speed information of the spindle motor 2, the clock signal generated by PLL processing for the wobble signal, and comparing the information with predetermined CLV reference speed information.

In addition, in the data playback mode, a playback clock signal generated by the PLL in the data signal processing circuit 5 serves as the current rotation speed information of the spindle motor 2. Thus, by comparing the playback clock signal with the predetermined CLV reference speed information, the spindle error signal can be generated.

By outputting the spindle drive signal generated on the basis of the spindle error signal, the spindle servo circuit 12 uses the spindle driver 17 to execute CLV rotation of the spindle motor 2.

The spindle servo circuit 12 also generates the spindle drive signal on the basis of a spindle-kick/brake-control signal, and controls the spindle driver 17 to executes operations such as start, stop, acceleration, and deceleration of the spindle motor 2.

The various operations in the servo system and recording/playback system are controlled by the system controller 10, which is formed by a microcomputer.

The system controller 10 executes various types of processing in response to commands that are given from the host device 100 through the host interface 8.

For example, when a write command is issued from the host device 100, first, the system controller 10 moves the optical pickup 1 to an address for writing. The ENC/DEC 7 executes the above-described encoding on data (such as video data and audio data) transferred from the host device 100. On the basis of the encoded data, the laser driver 13 is driven to emit a laser, whereby recording is executed.

In addition, when the disc drive apparatus receives, from the host device 100, a read command to request transfer of data recorded on the disc 90, first, the system controller 10 performs seek operation control, targeting a specified address. In other words, the system controller 10 commands the optical block servo circuit 11 to execute an access operation of the optical pickup 1 targeting an address specified by a seek command.

After that, the system controller 10 performs operation control necessary fro transferring data in a specified data interval to the host device 100. That is, the system controller 10 performs data reading from the disc 90, executes playback processing of the data signal processing circuit 5, the frame-sync-detecting/synchronization-protection circuit 6, and the ENC/DEC 7, and transfers requested data.

The example shown in FIG. 1 is described as the disc drive apparatus connected to the host device 100. However, a disc drive apparatus according to an embodiment of the present invention can have a form that is not connected to a different device. In this case, the disc drive apparatus includes operation and display units and its data input/output interface unit differs in configuration from that shown in FIG. 1. In other words, recording and playback may be performed depending on user's operations, and a terminal unit for inputting/outputting various types of data may be formed.

Obviously, various examples of the configuration of the disc drive apparatus are possible. For example, an example of a playback-only apparatus is also possible.

2. Frame-Sync Detection-and-synchronization-protection Circuit and Frame Sync Pattern FIG. 2 shows the configuration of the frame-sync-detecting/synchronization-protection circuit 6.

The frame-sync-detecting/synchronization-protection circuit 6 includes an FS (frame sync) detecting unit 21, a synchronization-protection/state-control unit 22, and a synchronization-protection setting register 23.

The FS detecting unit 21 detects a frame sync pattern by performing pattern matching for the binary data string from the data signal processing circuit 5, and outputs an FS detection timing signal.

The synchronization-protection/state-control unit 22 performs control of a sync protection state (described later), generation of a sync protection window signal for use in detecting FS depending on the sync protection state, and interpolating processing such as sync timing interpolation. The synchronization-protection/state-control unit 22 supplies the ENC/DEC 7 with a demodulation timing signal based on FS detection timing. The synchronization-protection/state-control unit 22 reports a sync protection state to the FS detecting unit 21 with a sync-protection-state reporting signal.

The synchronization-protection setting register 23 stores set values M and N for sync protection state control. The set values M and N are determined by the system controller 10. The synchronization-protection/state-control unit 22 performs sync protection state control on the basis of the set values M and N stored in the synchronization-protection setting register 23.

FIGS. 3A and 3B show, as the frame sync detected by the FS detecting unit 21, frame sync patterns defined in the Blu-ray Disc format.

FIG. 3A shows frame sync patterns for recordable discs (write-once discs and rewritable discs), FIG. 3B show frame sync patterns for playback-only discs (so-called "ROM discs").

Each frame sync pattern includes a 24-bit sync body that does not comply with RLL(1,7) PP modulation rules, and a 6-bit sync ID that serves as identification information of the frame sync in the order given. In FIGS. 3A and 3B, the 24-bit sync bodies and the sync IDs are represented by NRZ.

In the case of the recordable disc, as shown in FIG. 3A, FS0 to FS6 are defined as sync numbers. In the case of the playback-only disc, as shown in FIG. 3B, FS0 to FS6, and, in addition, FS7 and F8 are defined.

Each 24-bit sync body is represented by "#010100000000010000000010", and has a pattern (represented by "9T9T") having two consecutive 9T's that are run lengths each unique to the frame sync. As the symbol # at the start of the sync body, "0" or "1" is inserted in order for a pattern prior to # to satisfy RLL(1,7) PP modulation rules.

The sync patterns FS0 to FS8 are identified by their sync IDs although they have identical sync bodies.

For the above-described frame sync, the FS detecting unit 21 shown in FIG. 2 may basically detect "9T9T" as a unique pattern.

In other words, from the binary data string, "1000000001000000001" may be used as a pattern to be detected.

As can be understood from FIGS. 3A and 3B, each of sync patterns FS0 to FS8 invariably includes "2T" prior to "9T9T". Thus, the pattern to be detected by the FS detecting unit 21 may be set as "2T9T9T" including a pattern adjacent to the unique pattern of the unique run length, that is "101000000001000000001".

Identifying of frame sync patterns FS0 to FS6 (and FS7 and FS8) on the basis of the sync IDs is described below.

As described above, in the Blu-ray Disc format, information recording is performed in units of RUBs. In part (a) of FIG. 4, an RUB structure is shown. One RUB contains a total of 498 frames in which one link frame LF is added to each end of 496 frames Fs. 496 frames Fs form one ECC block.

Figure 4:
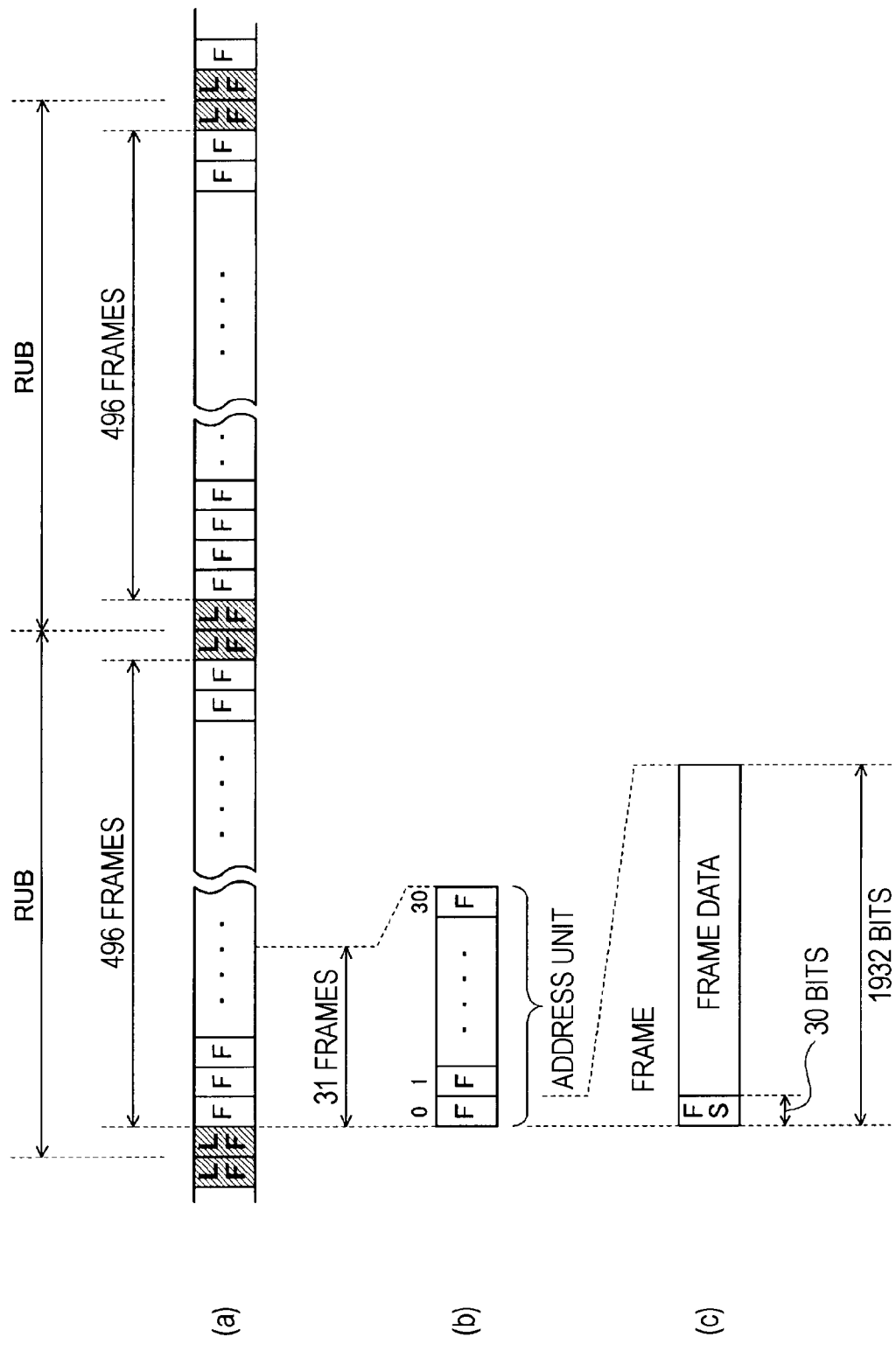
FIG. 4 has parts (a) to (c) illustrating frame sync mapping.

As shown in part (c) of FIG. 4, one frame F is a 1932-channel-bit data unit, and this frame F includes a 30-bit frame sync at its start. The 30-bit frame sync represents the above-described 24-bit sync body and 6-bit sync ID.

In the case of the recordable disc, a link frame LF functions as an area for establishing PLL synchronization in recording operation in units of RUBs, and also functions as a buffer area when adjacent RUB's are connected. In the case of the playback-only disc, the link frame LF is not originally necessary. However, the link frame LF is added as a dummy area in order to establish RUB structure consistency between the playback-only disc and the recordable disc.

Addressing of data to be recorded is performed for each 31-frame-unit address unit as shown in part (b) of FIG. 4. One address unit corresponds to one physical sector.

In other words, the 496 frames are separated into 16 address units, and physical sector addresses are given to the 16 address units.

Seven frame sync patterns, FS0 to FS6, are added to each of the 31 frames of the address unit in part (b) of FIG. 4, whereby the position (frame numbers 0 to 30) of each frame in one physical sector can be detected.

In the 31-frame-unit address unit (physical sector), frame sync patterns FS0 to FS6 are mapped to the 31 frames in the predetermined orders shown in FIGS. 5A and 5B. FIG. 5A shows the case of the recordable disc, and FIG. 5B shows the case of the playback-only disc. In both cases, the frame sync patterns are identically mapped to the 31 frames (frame numbers 0 to 30).

This is because, in order to realize identifying of 31 frames with seven types of frame sync patterns, seven frame sync patterns FS0 to FS6 are arranged in a predetermined order, whereby each frame number can be identified on the basis of a combination of frame sync patterns before and after each frame sync pattern.

As shown in FIGS. 5A and 5B, the first frame (frame number 0) of each physical sector is set as frame sync pattern FS0. Frame sync pattern FS0 is unique in the physical sector, whereby the start of the physical sector, that is, the address unit, can easily be detected. That is, frame sync pattern FS0 is used for physical sector number position detection.

Sync patterns FS1 to FS6 are assigned to the other frames (frame numbers 1 to 30) in the shown order.

In this case, all arrangements of five consecutive frame sync patterns are unique. Accordingly, by detecting arbitrary two among five sync patterns, the position in which frame in the address unit can be detected.

Specifically, on the basis of a combination of a sync pattern with frame number n and one of sync patterns with frame numbers n-1, n-2, n-3, and n-4, frame number n can be specified.

For example, even if a current frame has frame number 5, and frame sync patterns (FS1, FS2, and FS3) corresponding to less frame numbers 1, 2, and 3 are lost, the current frame can be identified as having frame number 5 on the basis of frame sync pattern FS3 with frame number 4 prior to frame number 5 and frame sync pattern FS1 for the current frame. This is because frame sync pattern FS1 follows frame sync pattern FS3 in a particular portion, that is, only in frame 4 or 5.

In the case of the recordable disc, no frame sync pattern is given to a link frame LF. In the case of the playback-only disc, frame sync patterns FS7 and FS8 are given to two link frames LFs.

As described above, on the frame sync patterns FS0 to FS6, each frame in one physical sector can be detected.

In other words, in a period (lock state and forward protection state) after appropriate frame sync detection is initiated, the ENC/DEC 7 can perform decoding in units of RUBs (ECC blocks) on the basis of demodulation timing signal based on the frame sync timing. At this time, for each frame, the sync ID is used to detect a frame sync pattern (FS0 to FS6), and a frame number is identified.

In this embodiment, as shown in FIG. 2, sync ID information representing the above-described sync ID is supplied from the ENC/DEC 7 to the FS detecting unit 21.

3. Synchronization-protection-state Transition

As described with reference to FIG. 2, the synchronization-protection/state-control unit 22 performs sync protection by using a frame-sync-detection result obtained by the FS detecting unit 21, and outputs sync-protected frame sync detection timing as a demodulation timing signal to the ENC/DEC 7. A commonly used synchronization protecting operation assumed in this embodiment is briefly described below.

Figure 6:
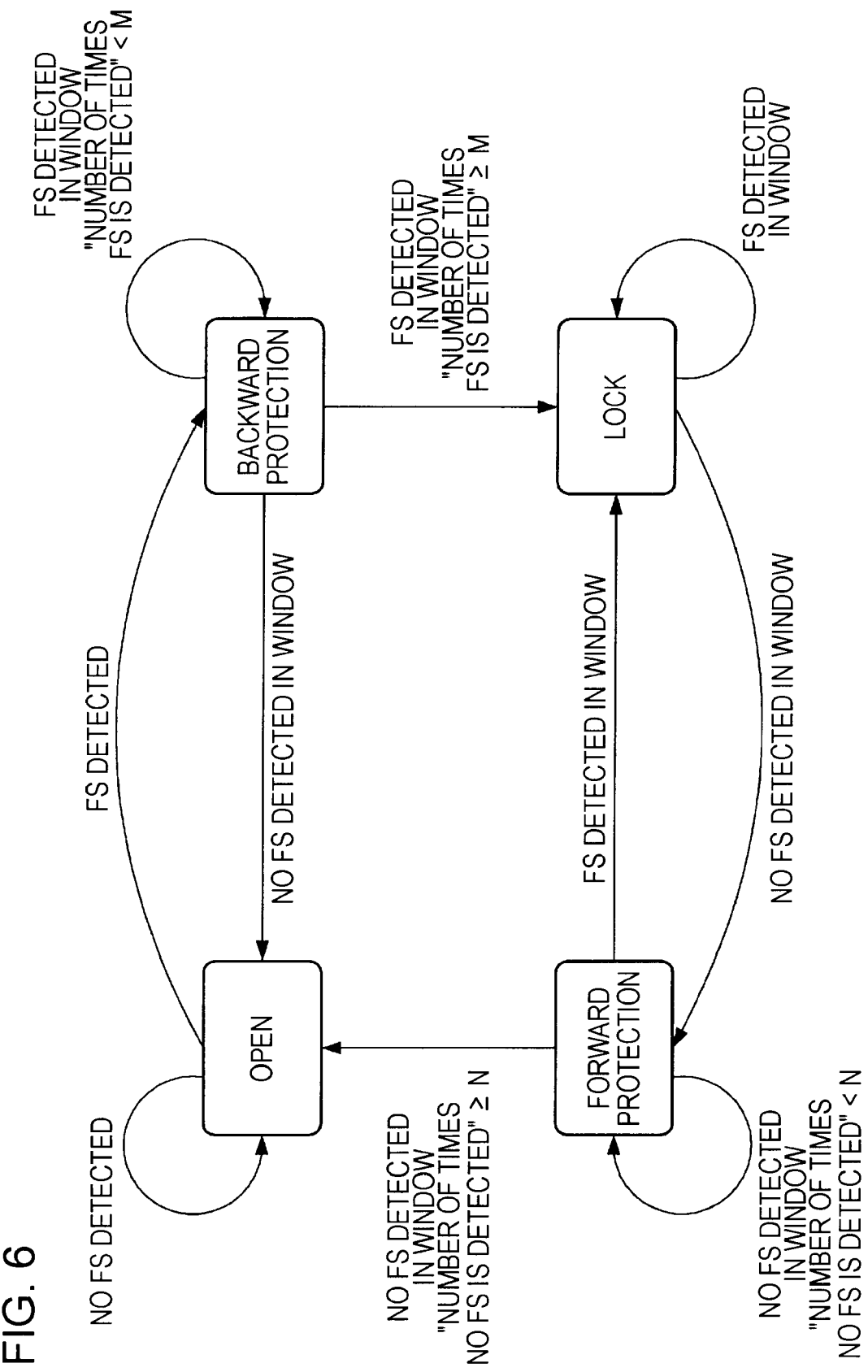
FIG. 6 is an illustration of synchronization protection state transitions in the embodiment of the present invention.

FIG. 6 shows transitions of four frame-sync-pattern synchronization protection states and transition conditions of the four states. The four states are as follows: an open state; a backward protection, a lock state, and a forward protection state.

The open state is an initial state or a state in which no frame sync pattern is detected since there is constantly no RF signal.

The backward protection state is a state in which, when a frame sync pattern is detected in the open state, it is confirmed whether the open state is changed to the lock state by using the frame sync timing.

The lock state is a state in which a frame sync pattern can appropriately be detected in a synchronization protection window.

The forward protection state is a state in which it is confirmed that no frame sync pattern is continuously detected.

In a period in which no frame sync pattern can be detected, the open state is maintained. When a frame sync pattern is detected, the open state is changed to the backward protection state.

After the open state is changed to the backward protection state, a count operation based on detected frame sync timing initiates generation of the synchronization protection window signal. After that, it is monitored whether a state in which, in a synchronization protection window signal period, a frame sync pattern is detected is continued M consecutive times. If no frame sync pattern can be detected before the state in which, in the synchronization protection window signal period, the frame sync pattern is detected is continued M consecutive times, the backward protection state is returned to the open state. Alternatively, if the state in which, in the synchronization protection window signal period, the frame sync pattern is detected is continued M consecutive times, the backward protection state is changed to the lock state.

Parts (a) to (e) of FIG. 7 show a case in which the open state is changed to the backward protection state, and the backward protection state is changed to the lock state. Parts (a), (b), (c), (d), and (e) of FIG. 7 show an RF signal, a frame-sync-pattern detection result, a synchronization protection window signal, the number of times backward protection is performed, and the synchronization protection state, respectively.

In the open state, the first frame sync pattern shown in part (b) of FIG. 7 is detected, whereby the open state is changed to the backward protection state. In the backward protection state, the synchronization protection window signal is generated as shown in part (c) of FIG. 7, and it is monitored whether a frame sync pattern can be detected in the synchronization protection window signal period. In this case, the number of times backward protection is performed is set to three. Accordingly, when it is confirmed that, in the synchronization protection window signal period, a frame sync pattern can be detected three consecutive times, the backward protection state is changed to the lock state.

After the backward protection state is changed to the lock state, if no frame sync pattern can be detected in the synchronization protection window signal period, the lock state is changed to the forward protection state.

In the forward protection state, it is monitored whether a state in which no frame sync pattern can be detected in the synchronization protection window signal period occurs N consecutive times. When a frame sync pattern can be detected before the state in which no frame sync pattern can be detected in the synchronization protection window signal period occurs N consecutive times, the forward protection state is returned to the lock state. Alternatively, if the state in which no frame sync pattern can be detected in the synchronization protection window signal period occurs N consecutive times, the forward protection state is changed to the open state.

Parts (a) to (e) of FIG. 8 show a case in which the lock state is changed to the forward protection state, and the forward protection state is changed to the open state.

When, as shown in part (b) of FIG. 8, no frame sync pattern can be detected in the lock state, In this forward protection state, the number of times no frame sync pattern can consecutively be detected in the synchronization protection window signal period is counted as the number of times (part (d) of FIG. 8) the synchronization protection is performed. In this case, the number of times the synchronization protection is performed is three (indicated by N=3). When it is confirmed that the state in which no frame sync pattern can be detected occurs three consecutive times, the forward protection state is changed to the open state.

4. Frame Sync Detecting Operation

A frame sync detecting operation by the FS detecting unit 21, which is a feature of the embodiment, is described below.

As described above, in the frame sync detecting operation, basically, 9T9T, that is, "1000000001000000001", may be used as a detection pattern. Alternatively, 2T9T9T, that is, "1101000000001000000001", may be used as a detection pattern.

In a case in which 2T9T9T is used as a detection pattern, basically, the FS detecting unit 21 finds out the pattern 2T9T9T from the input binary data string. In this embodiment, not only 2T9T9T but also other detection patterns are set. The set detection patterns are shown as P1 to P11 in FIG. 9. Each detection pattern is described later. Detection pattern P1 is an original pattern of 2T9T9T, while detection patterns P2 to P11 are particular patterns different from 2T9T9T.

When the FS detecting unit 21 detects a pattern corresponding to one of detection patterns P1 to P11 from the binary data string, the FS detecting unit 21 performs processing for regarding the detected pattern as a frame sync pattern.

Setting of detection patterns P2 to P11 other than the original detection pattern 2T9T9T, that is, extension of detection patterns for the frame sync pattern, is performed in order to enhance frame sync detection capability. First, a case in which detection pattern P1 (2T9T9T) is used for frame-sync-pattern detection, and a case in which no frame-sync-pattern detection can be performed only with detection pattern P1 are shown in FIGS. 11 to 14.

Figure 11:
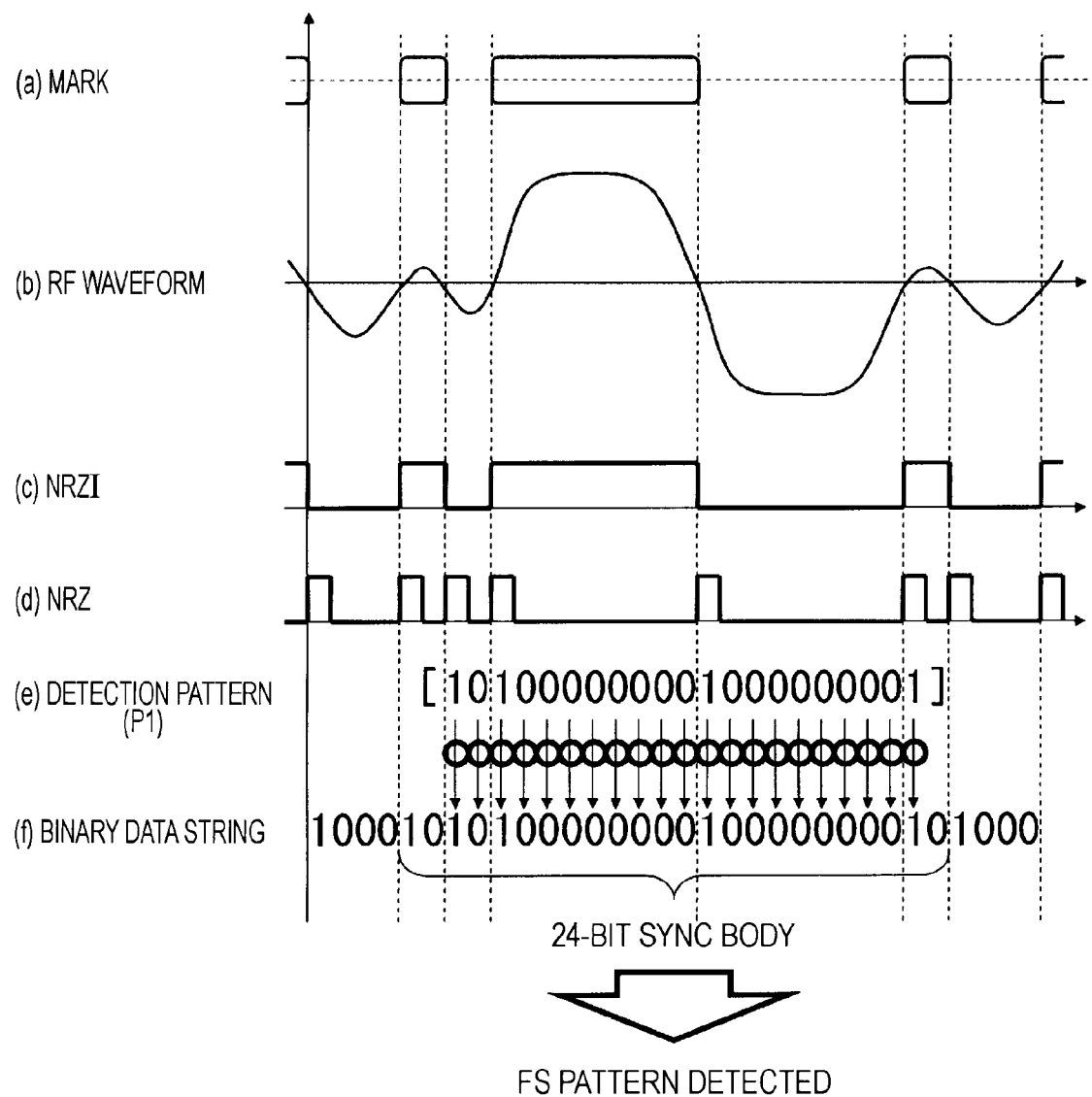
FIG. 11 has parts (a) to (f) illustrating an example of frame sync detection in the embodiment of the present invention.
Figure 12:
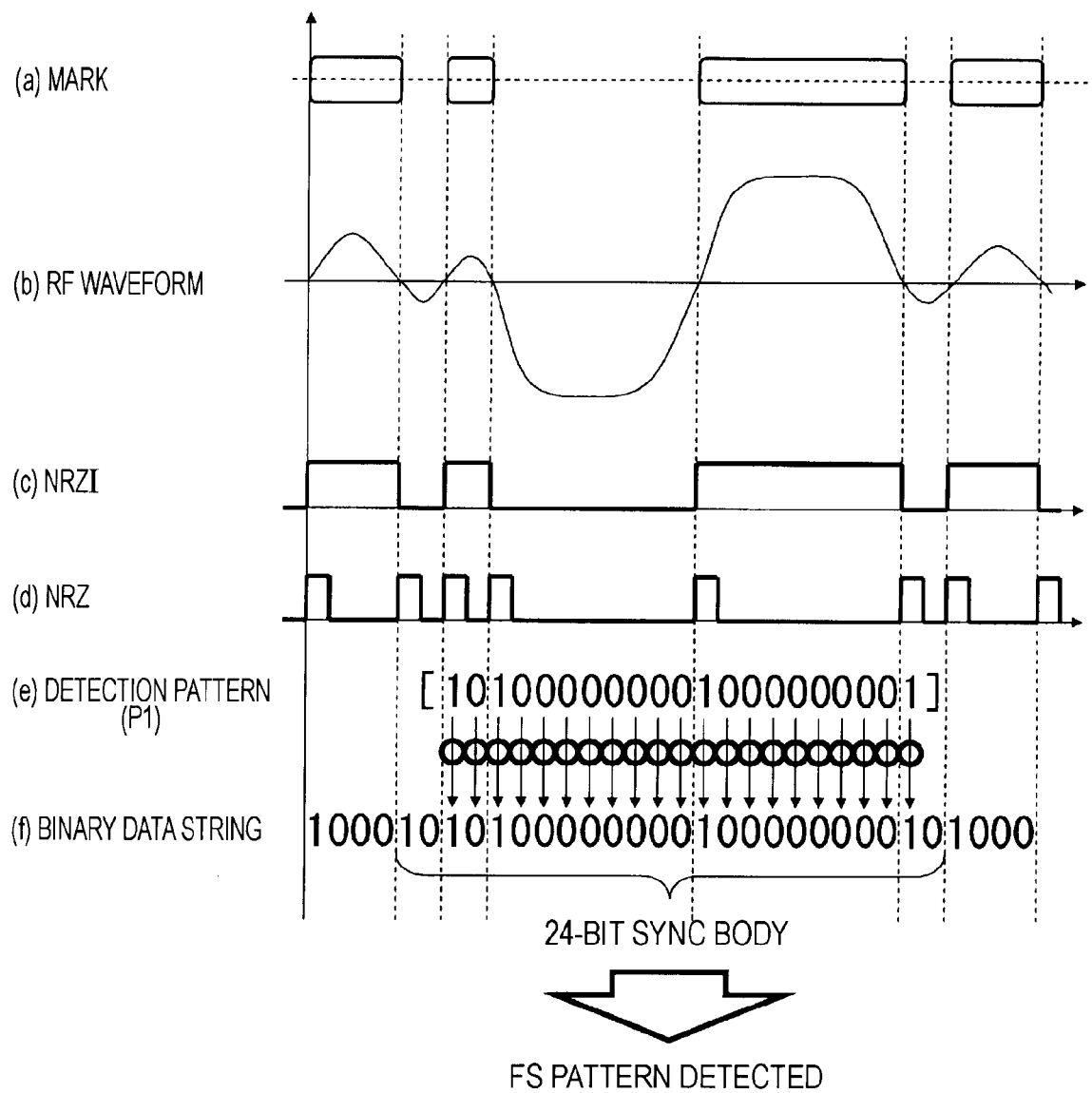
FIG. 12 has parts (a) to (f) illustrating an example of frame sync detection in the embodiment of the present invention.

FIGS. 11 and 12 show that frame-sync-pattern detection can be performed with detection pattern P1 (2T9T9T). In each of FIGS. 11 and 12, part (a) shows a mark string (recording data including marks and spaces on the disc 90) on the disc 90, and part (b) shows an RF playback waveform from the mark string. In addition, part (c) shows an NRZI signal generated by binarizing the RF playback waveform, and part (d) shows an NRZ signal generated by performing NRZ conversion on the NRZI signal. Part (e) shows detection pattern P1 for detecting a frame sync pattern from the NRZ signal, and part (f) shows a binary data string generated by binarizing the NRZ signal shown in part (d) into "1's" and "0's".

In the example shown in FIG. 11, by reading the mark string (part (a) of FIG. 11) on the disc 90, the RF playback waveform (part (b) of FIG. 11) is obtained, and decoding of the data signal processing circuit 5 inputs the binary data string (part (f) of FIG. 11) to the FS detecting unit 21. At this time, in the binary data string, a pattern that matches detection pattern P1 (2T9T9T) is detected. This indicates that frame-sync-pattern detection can be performed.

The example shown in FIG. 12 differs from that shown in FIG. 11 in that the relationship between marks and spaces in part (a) of FIG. 12 is reverse to that shown in part (a) of FIG. 11. In this case, the RF waveform and NRZI signal waveform shown in parts (b) and (c) of FIG. 12 are inversions of the waveforms shown in parts (b) and (c) of FIG. 11. As can be understood from parts (d) and (f) of FIG. 12, the NRZ signal waveform and the binary data string are similar to those shown in parts (d) and (f) of FIG. 11.

Also in this case, the binary data string shown in part (f) of FIG. 12 is input to the FS detecting unit 21. At this time, a pattern that matches detection pattern P1 (2T9T9T) in part (e) of FIG. 12 is detected, whereby frame-sync-pattern detection can be performed.

Each of the examples shown in FIGS. 11 and 12 is an example of a normal state in which the pattern 2T9T9T appears in the binary data string. Both are similar to the related art in that pattern matching is performed by using detection pattern P1.

However, there is a case in which one of two consecutive run lengths of 9T9T may break.

For example, for a unique pattern of nTnT (n=9 in the above examples) in an expected frame sync pattern, a broken unique pattern may appear as uTvTwTnT or nTuTvTwT, where n=9 and u+v+w=n.

These patterns do not match detection pattern P1. Thus, in the sync detection method of the related art that uses only detection pattern P1, it is difficult to detect a frame sync pattern.

When no frame sync pattern can be detected with appropriate timing, a synchronization protection function interpolates frame sync timing in the above-described forward protection period. At this time, if a disturbance slips the PLL for generating a playback clock signal from an RF signal, demodulation timing of a frame with the sync timing interpolated shifts from an actual frame position, so that false data is demodulated.

In addition, if frame sync pattern breaking as described above constantly occurs, even the interpolation has limitation.

These result in a deterioration in error rate, thus causing performance deterioration.

Figure 13:
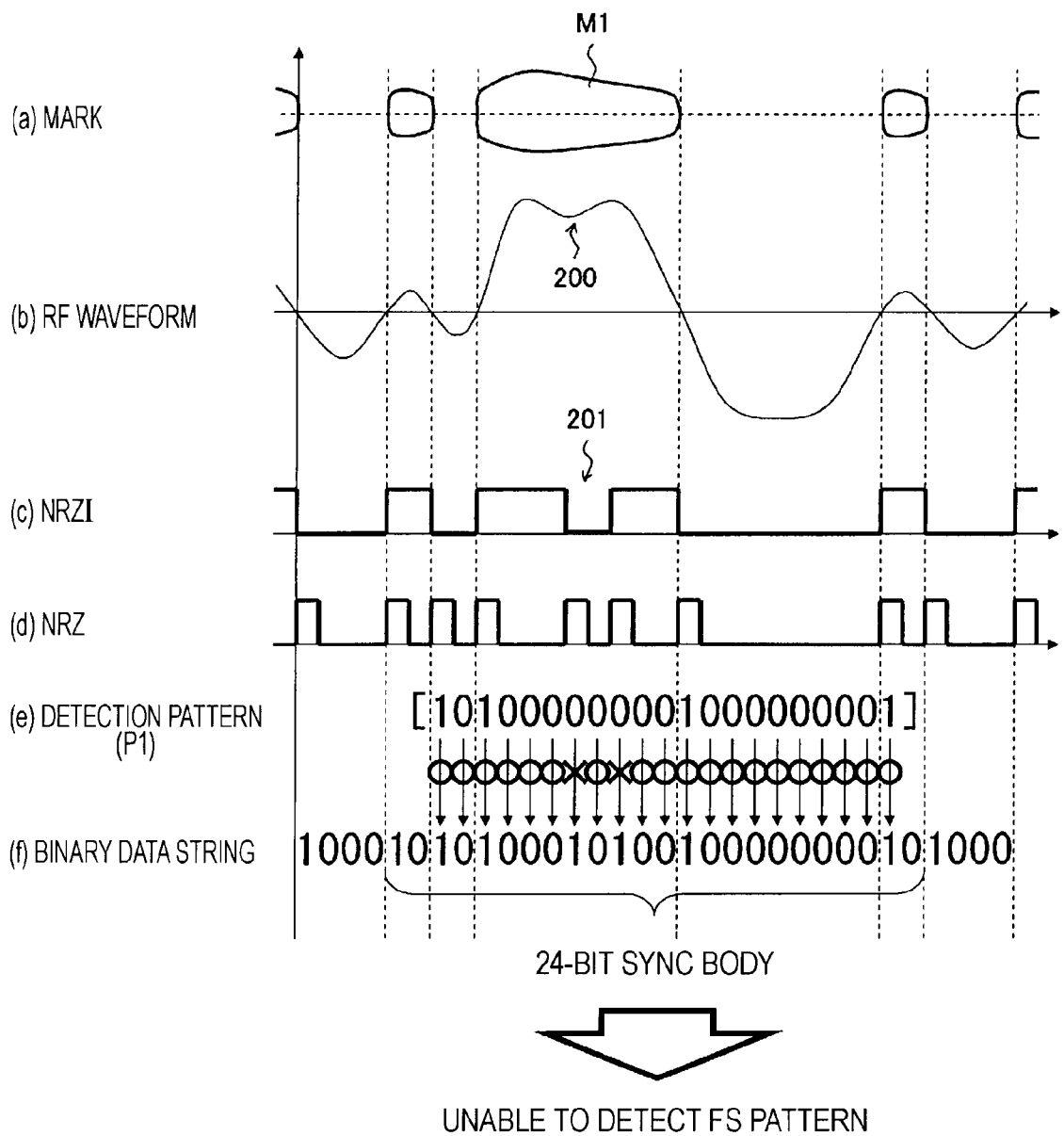
FIG. 13 has parts (a) to (f) illustrating a case in which no frame sync pattern can be detected.
Figure 14:
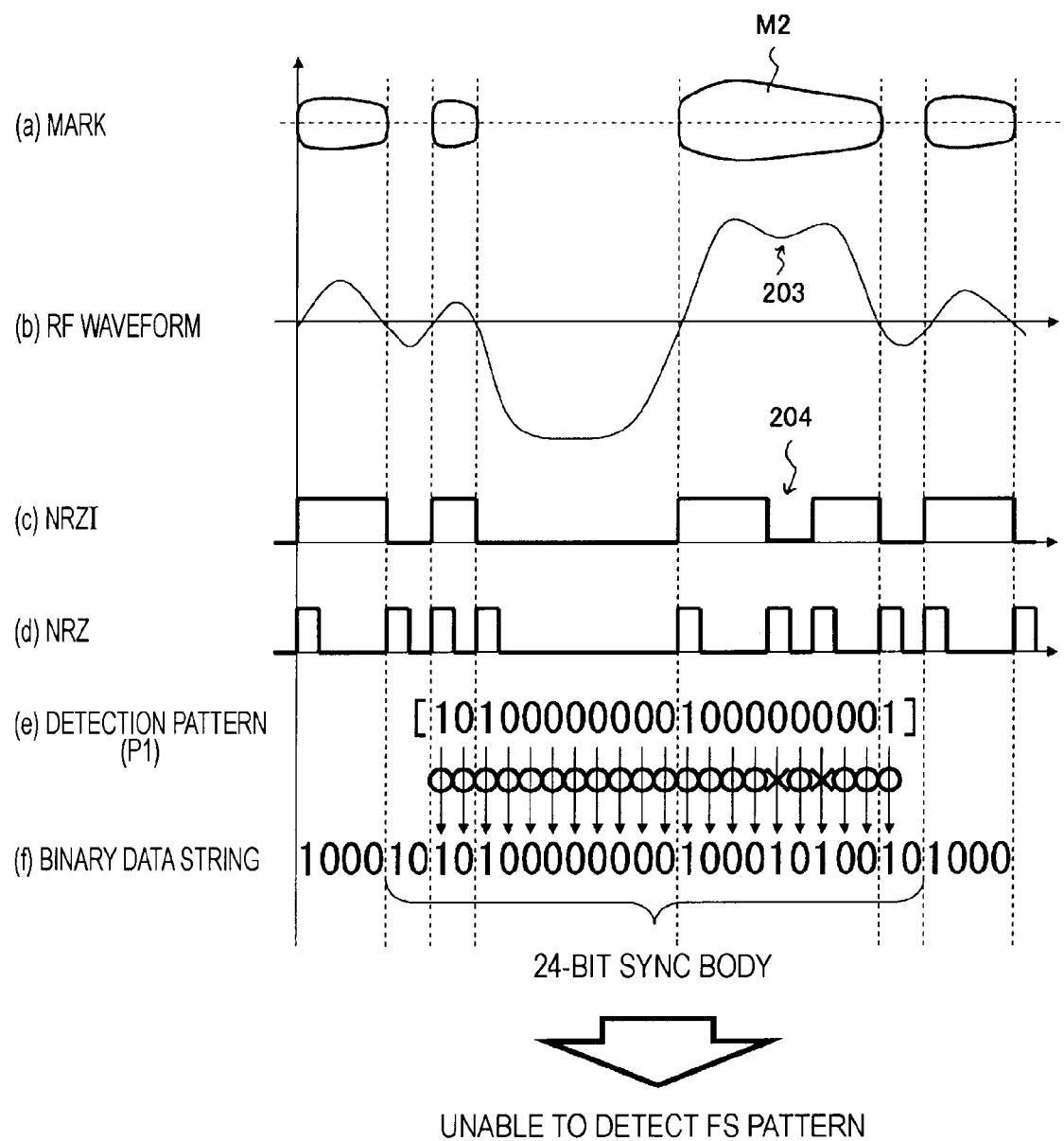
FIG. 14 has parts (a) to (f) illustrating a case in which no frame sync pattern can be detected.

Here, cases in which, when the disc 90 has low recording quality and is played back, a frame sync pattern constantly breaks are shown in FIGS. 13 and 14.

Part (a) of FIG. 13 shows that deformed marks are recorded identically in position to the marks in part (a) of FIG. 11. In this case, mark M1 forming the first 9T of the pattern 9T9T is recorded to be broad. As shown in part (b) of FIG. 13, the RF signal is detected in a state in which its waveform includes a dent 200.

When the above RF signal is decoded and binarized in the above-described PRML method by the data signal processing circuit 5, although the dent 200 of the RF waveform does not cross zero, in a binarized result of the RF waveform, an L (low) level portion 201 may appear as shown in part (c) of FIG. 13. In this case, the signal waveform in NRZ is as shown in part (d) of FIG. 13, and a corresponding portion of the binary data string which should originally be "1100000000" is changed to "1100010100" as shown in part (f) of FIG. 13. As a result, the binary data string in part (f) of FIG. 13 does not match detection pattern P1, so that no frame sync pattern can be detected.

This is a case in which, since 9T in mark M1 breaks into 4T2T3T, the pattern 9T9T changes to 4T2T3T9T.

In addition, part (a) of FIG. 14 shows that deformed marks are recorded identically in position to the marks in part (a) of FIG. 12. Specifically, mark M2 forming the remaining 9T of the pattern 9T9T is recorded to be broad, and, as shown in part (b) of FIG. 14, the RF signal is detected in a state in which its waveform includes a dent 203.

In this case, when the above RF signal is decoded and binarized in the above-described PRML method by the data signal processing circuit 5, although the dent 203 of the RF waveform does not cross zero, in a binarized result of the RF waveform, an L level portion 204 may appear as shown in part (c) of FIG. 14, and the signal waveform in NRZ is as shown in part (d) of FIG. 14. That is, a portion of the binary data string which should originally be "100000000" is changed to "100010100". Also, in this case, the binary data string in part (f) of FIG. 14 does not match detection pattern P1, so that no frame sync pattern can be detected.

This is a case in which, since 9T in mark M2 breaks into 4T2T3T, the pattern 9T9T changes to 9T4T2T3T.

In a case in which, as defined in the Blu-ray Disc format, a frame sync pattern includes two consecutive run lengths unique to the frame sync pattern, one of the two consecutive run lengths is a space and the other is a mark, so that, even if the marks are deformed as shown in FIGS. 13 and 14, one unique run length is not broken since it is a space. In other words, in this condition, only either unique run length becomes an error.

In addition, such unique run length breaking is caused by irregularity in RF signal waveform when recording signal quality is bad and the mark shape is inappropriate. In particular, when an RF signal is binarized by Viterbi decoding, such run length breaking often occurs.

Such irregularity in sync pattern is not locally caused by a scratch or dirt on the disc 90. Thus, it is difficult for the irregularity in sync pattern to be corrected by sync timing interpolation.

To cope with such circumstances, in this embodiment, in addition to original detection pattern P1, particular detection patterns are set as extended detection patterns. The particular detection patterns are the detection patterns P2 to P11 shown in FIG. 9.

In other words, in this embodiment, when a pattern corresponding not only to original detection pattern P1 but also to one of detection patterns P2 to P11 appears in the binary data string, the FS detecting unit 21 performs processing, regarding the corresponding pattern as a frame sync pattern.

Detection patterns P2 to P11 are as follows. Each detection pattern includes a portion represented by uTvTwT, and, in all the cases, u+v+w=9.

Detection pattern P2 is represented by "2T9TuTvTwT+FSID". "FSID" is one of consecutive sync IDs for sync bodies, where u>2 and w>2.

For detection pattern P2, the binary data string in NRZ waveform is represented by "10100000000100xxxx0010+FSID", where "x" is a portion that is out of pattern matching.

This assumes a case in which the remaining 9T of 9T9T breaks, and a state in which u>2 and w>2 specifically corresponds to a case in which the remaining 9T is detected as one of "3T2T4T", "3T3T3T", and "4T2T3T".

In addition, in order to enhance security for false detection, a condition of FSID matching is added.

Detection pattern P3 is represented by "2TuTvTwT9T+FSID", where u>2 and w>2.

For this detection pattern P3, the binary data string in NRZ waveform is "10100xxxx0010000000010+FSID".

This assumes a case in which the first 9T of 9T9T breaks into uTvTwT, and a state in which u>2 and w>2 specifically corresponds to a case in which the first 9T is detected as one of "3T2T4T", "3T3T3T", and "4T2T3T".

In addition, in order to enhance security for false detection, a condition of FSID matching is added.

Detection pattern P4 is represented by "2T9TuTvTwT+FSID", but the conditions u>2 and w>2 are not used. For detection pattern P4, the binary data string in NRZ waveform is "101000000001xxxxxxxx10+FSID".

This assumes a case in which the remaining 9T of 9T9T breaks into uTvTwT, and corresponds to a state in which the remaining 9T is detected as one of "3T2T4T", "3T3T3T", "4T2T3T", "2T2T5T", "2T3T4T", "2T4T3T", "2T5T2T", "3T4T2T", and "4T3T2T".

In addition, in order to enhance security for false detection, a condition of FSID matching is added.

Detection pattern P5 is represented by "2TuTvTwT9T+FSID", but the conditions u>2 and w>2 are not used. For this detection pattern P5, the binary data string in NRZ waveform is "101xxxxxxxx10000000010+FSID".

This assumes a case in which the first 9T of 9T9T breaks into uTvTwT, and specifically corresponds to a state in which the first 9T is detected as one of "3T2T4T", "3T3T3T", "4T2T3T", "2T2T5T", "2T3T4T", "2T4T3T", "2T5T2T", "3T4T2T", and "4T3T2T".

In addition, in order to enhance security for false detection, a condition of FSID matching is added.

Detection pattern P6 is represented by "2T9TuTvTwT", where u>2 and w>2.

This detection pattern P6 is such that the condition of sync ID matching is not used for detection pattern P2, and, for the detection pattern P6, the binary data string in NRZ waveform is "10100000000100xxxx001". This assumes a case in which the remaining 9T of 9T9T breaks into uTvTwT, and a state in which u>2 and w>2 specifically corresponds to a case in which the remaining 9T is detected as one of "3T2T4T", "3T3T3T", and "4T2T3T".

Detection pattern P7 is represented by "2TuTvTwT9T", where u>2 and w>2.

This detection pattern P7 is such that the condition of sync ID matching is not used for detection pattern P3, and, for detection pattern P7, the binary data string in NRZ waveform is "10100xxxx001000000001". This assumes a case in which the first 9T of 9T9T breaks into uTvTwT, and a state in which u>2 and w>2 specifically corresponds to a case in which the first 9T is detected as one of "3T2T4T", "3T3T3T", and "4T2T3T".

Detection pattern P8 is represented by "2T9TuTvTwT", where w>2.

This detection pattern P6 is such that the condition u>2 is not used for detection pattern P6, and, for the binary data string in NRZ waveform is "101000000001xxxxxx001". This assumes a case in which the remaining 9T of 9T9T breaks into uTvTwT, and a state in which w>2 specifically corresponds to a case in which the remaining 9T is detected as one of "3T2T4T", "3T3T3T", "4T2T3T", "2T2T5T", "2T3T4T", and "2T4T3T".

Detection pattern P9 is represented by "2TuTvTwT9T", where w>2.

This detection pattern P9 is such that the condition u>2 is not used for detection pattern P7, and, for detection pattern P9, the binary data string in NRZ waveform is "101xxxxxx001000000101". This assumes a case in which the first 9T of 9T9T breaks into uTvTwT, and a state in which w>2 specifically corresponds to a case in which the first 9T is detected as one of "3T2T4T", "3T3T3T", "4T2T3T", "2T2T5T", "2T3T4T", and "2T4T3T".

Detection pattern P10 is represented by "2T9TuTvTwT", where no other conditions are added. For detection pattern P10, the binary data string in NRZ waveform is "101000000001xxxxxxxx1". This assumes a case in which the remaining 9T of 9T9T breaks into uTvTwT, and specifically corresponds to a case in which the remaining 9T is detected as one of "3T2T4T", "3T3T3T", "4T2T3T", "2T2T5T", "2T3T4T", "2T4T3T", "2T5T2T", "3T4T2T", and "4T3T2T".

Detection pattern P11 is represented by "2TuTvTwT9T", where no other conditions are added. For detection pattern P11, the binary data string in NRZ waveform is "101xxxxxxxx1000000001". This assumes a case in which the first 9T of 9T9T breaks into uTvTwT, and specifically corresponds to a case in which the first 9T is detected as one of "3T2T4T", "3T3T3T", "4T2T3T", "2T2T5T", "2T3T4T", "2T4T3T", "2T5T2T", "3T4T2T", and "4T3T2T".

Detection patterns P1 to P11 have different security levels in false detection of frame sync patterns. In FIG. 9, "Level 1" to "Level 6" are shown as security levels of detection patterns P2 to P11. "Level 1" represents the highest security level (low possibility of false detection).

For detection patterns P10 and P11 having Level 6, a case in which one of 9T9T breaks into three T's is unconditionally regarded as a frame sync pattern. Thus, the use of detection patterns P10 and P11 can widely cope with irregularity in frame sync pattern, but has a relatively high possibility of false detection.

For detection patterns P8 and P9 having Level 5, a breaking manner regarded as a frame sync pattern is limited to a case in which one of 9T9T breaks into three T's and in which w>2. For detection patterns P6 and P7 having Level 4, a breaking manner regarded as a frame sync pattern is limited to a case in which one of 9T9T breaks into three T's and in which u>2 and w>2. As described with reference to FIGS. 13 and 14, when the run length 9T of the frame sync pattern breaks, it is confirmed that, in many cases, the portion uT or wT changes to 3T or 4T. By adding the condition w>2, and adding the conditions u>2 and w>2, a possibility of false detection can be lowered and the security level can be raised.

Detection patterns P2 and P3 have Level 2 and detection patterns P4 and P5 have Level 3 because, since their sync IDs are also used for pattern matching, they have high security for them to be detected as frame sync pattern. A difference between Levels 2 and 3 indicates whether or not the conditions u>2 and w>2 are added.

Detection pattern P1 is the original detection pattern. Thus, obviously, detection pattern P1 has Level 1, which represents the highest security since a pattern with 9T9T unbroken is used to perform pattern matching.

In the FS detecting unit 21, the detection patterns P2 to P11 shown in FIG. 9 are set as detection patterns to be subject to pattern matching for a binary data string. When the FS detecting unit 21 can detect, in the input binary data string, a pattern corresponding to one of detection patterns P2 to P11, the FS detecting unit 21 outputs an FS (frame sync) detection timing signal as frame sync detection to the synchronization-protection/state-control unit 22.

In FIG. 9, for each of detection patterns P2 to P11 by synchronization protection state, the representation "USABLE" or "NOT USABLE" is shown. This is because each detection pattern is not usable depending on a type of synchronization protection state. In other words, each of detection patterns P2 to P5 that use sync IDs is not usable in the open state or the forward protection state. This is because, in the open state or the forward protection state, the ENC/DEC 7 can detect no sync ID.

In order for the FS detecting unit 21 to perform pattern matching based on detection patterns P2 to P5, it is necessary for the FS detecting unit 21 to know a sync ID appearing in the input binary data string. In other words, it is difficult to perform pattern matching using a sync ID (FSID) unless the FS detecting unit 21 is in a period in which it can obtain sync ID information from the ENC/DEC 7. The pattern matching is possible only if the synchronization protection state is the lock state or the forward protection state.

Figure 10:
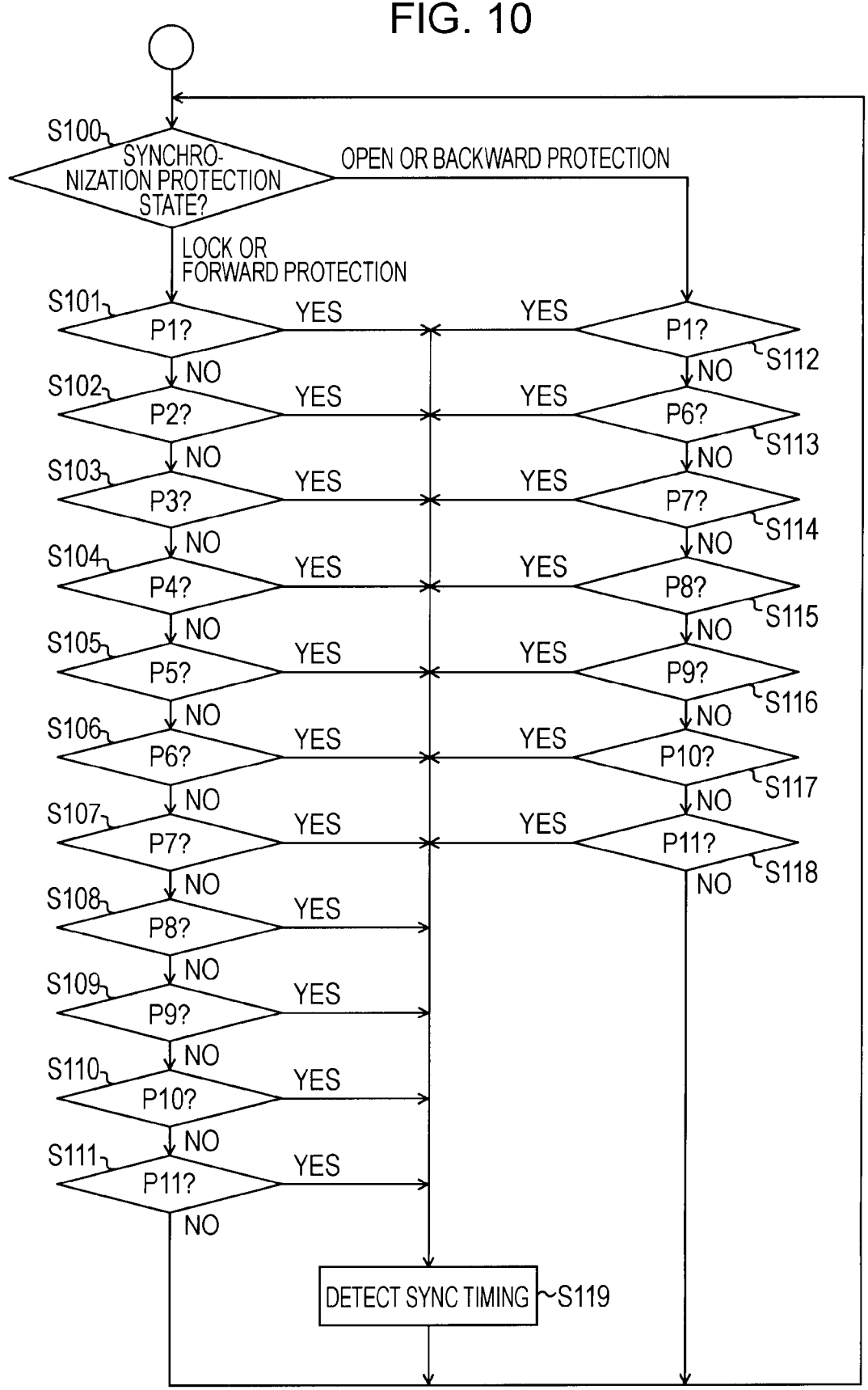
FIG. 10 is a flowchart showing a frame sync detecting operation in the embodiment of the present invention.

An example of a process of the frame sync detecting operation by the FS detecting unit 21 is shown in the flowchart of FIG. 10.

The FS detecting unit 21 can identify the current synchronization protection state on the basis of the sync-protection-state reporting signal from the synchronization-protection/state-control unit 22. In step S100, a detection pattern for use in pattern matching is selected on the basis of the current synchronization protection state.

When the synchronization protection state is one of the lock state and the forward protection state, one of detection patterns P1 to P11 is selected for use in pattern matching. In step S101 to S111, for each of detection patterns P1 to P11, pattern matching is performed.

If, in the binary data string, a pattern corresponding to even one of detection patterns P1 to P11 appears, in step S119, the FS detecting unit 21 regards the corresponding pattern as a frame sync, and outputs an FS detection timing signal to the synchronization-protection/state-control unit 22.

In addition, if the synchronization protection state is one of the open state and the backward protection state, detection patterns P1, and P6 to P11, excluding detection patterns P2 to P5, are selected for use in pattern matching. In steps S112 to S118, for each of detection patterns P1, and P6 to P11, pattern matching is performed.

If, in the binary data string, a pattern corresponding to even one of detection patterns P1, and P6 to P11 appears, in step S119, the FS detecting unit 21 regards the corresponding pattern as a frame sync, and outputs an FS detection timing signal to the synchronization-protection/state-control unit 22.

In this frame sync detecting operation, as shown in FIGS. 11 and 12, frame sync detection based on matching to detection pattern P1 is performed, and, in addition, even if one of 9T9T breaks, frame sync detection can be performed.

Figure 15:
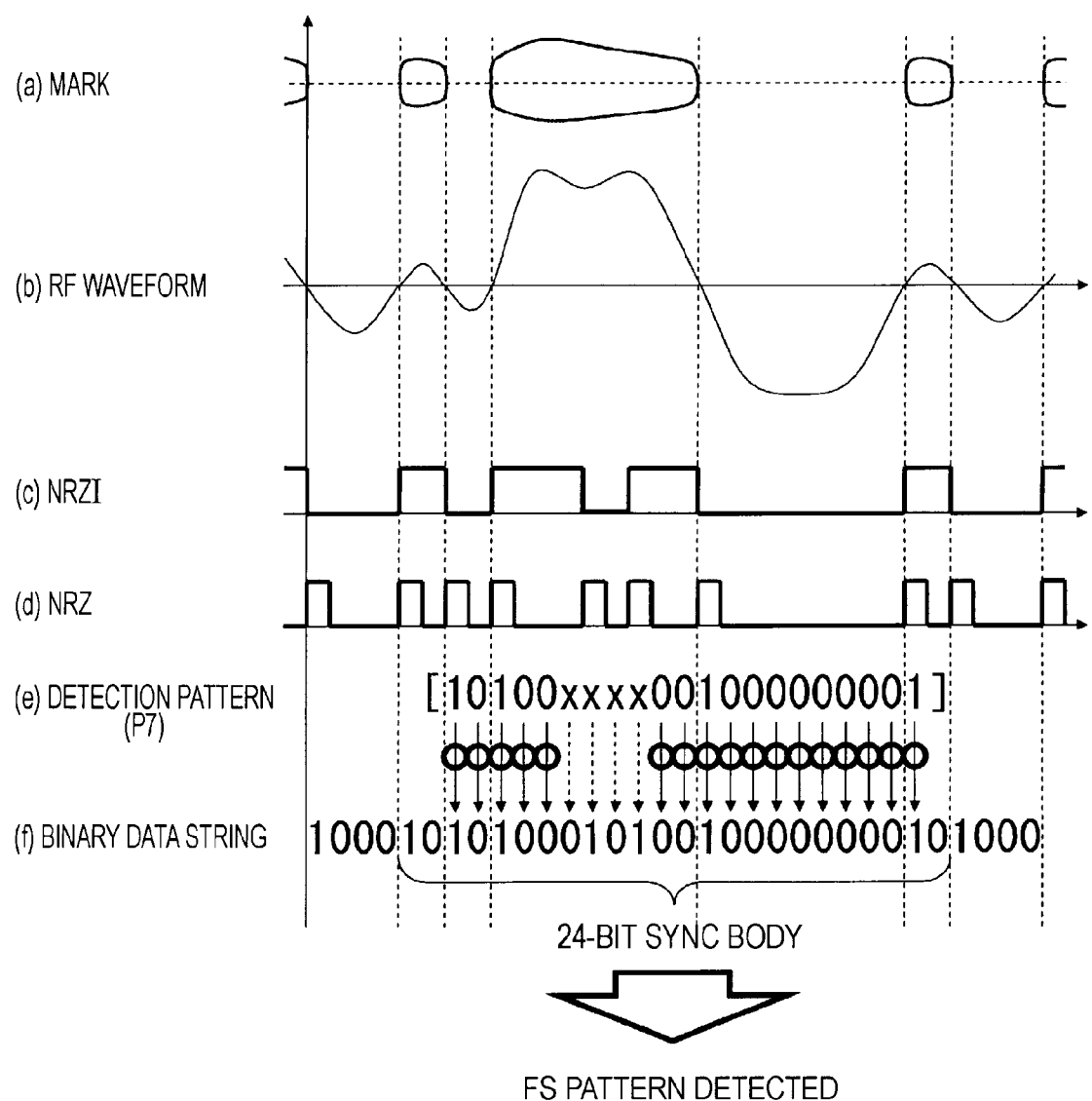
FIG. 15 has parts (a) to (f) illustrating an example of frame sync detection in the embodiment of the present invention.
Figure 16:
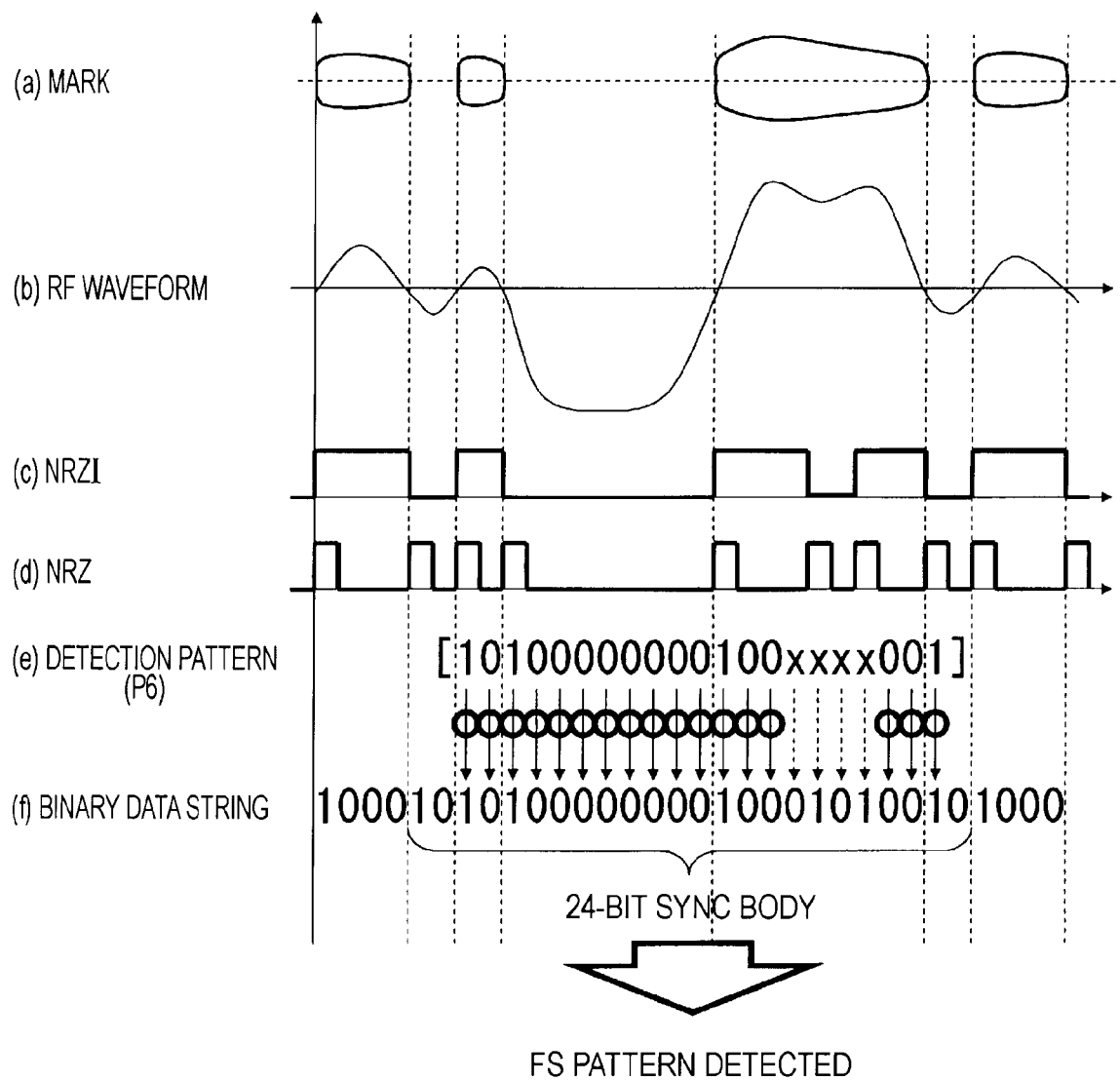
FIG. 16 has parts (a) to (f) illustrating an example of frame sync detection in the embodiment of the present invention.

FIGS. 15, 16, and 17 show examples of this case.

FIG. 15 shows that mark shapes are irregular as shown in FIG. 13. As shown in FIG. 15, the first 9T of 9T9T breaks into "100010100", that is, 4T2T3T. However, the portion 2T4T2T3T9T including 4T2T3T corresponds to the detection pattern P7 shown in part (e) of FIG. 15. Thus, the pattern can be detected as a frame sync.

FIG. 16 shows that mark shapes are irregular as shown in FIG. 14. As shown in FIG. 16, the remaining 9T of 9T9T breaks into "100010100", that is, 4T2T3T. However, the portion 2T9T4T2T3T including 4T2T3T corresponds to the detection pattern P6 shown in part (e) of FIG. 16. Thus, the pattern can be detected as a frame sync.

As in the examples shown in FIGS. 15 and 16, by providing either 9T with portion (x) tolerating arbitrary bits, false detection of the binary data string can be excluded, thus enabling frame sync detection.

Similarly to FIG. 16, FIG. 17 shows that, although marks shapes are irregular, pattern matching is performed also for a sync ID. It is assumed that a frame in which "sync ID (FSID)"=3.

In this case, a pattern that should originally be detected as 2T9T9T+FSID is changed to 2T9T4T2T3T+FSID. However, if "100001" of "sync ID (FSID)"=3 matches, in this case, the pattern corresponds to detection pattern P2, and can be detected as a frame sync.

In the case of one of the lock state and the forward protection state, by performing pattern matching even for a sync ID, a possibility of false detection of frame sync pattern can be decreased, thus enabling more reliable frame sync detection.

As described above, in this embodiment, the FS detecting unit 21 extends detection patterns for use in pattern matching. Detection patterns P2 to P11 extended are set to each include at least one unique run length (9T). In other words, they are patterns in each of which one of two consecutive unique run lengths is broken. One of detection patterns P1 to P11 is detected in the binary data string, whereby the above sync signal is regarded as being detected. This enhances frame sync detection capability, and further improves playback performance.

In addition, on the basis of the synchronization protection state, it is selected whether, among detection patterns P1 to P11, detection patterns P2 to P5 each including a sync ID are to be used for sync signal detection. That is, when the FS detecting unit 21 can identify a sync ID, by also using the sync ID portion for pattern matching, the accuracy of sync detection can be increased.

In the above examples, as shown in FIG. 10, the FS detecting unit 21 performs pattern matching for all detection patterns P1 to P11. However, actually, set detection pattern types are not limited to eleven types, that is, detection patterns P1 to P11, but the types may be less or more. Patterns set as detection patterns and pattern types may be appropriately determined in design.

In addition, among a plurality of set detection patterns (for example, P1 to P11), detection patterns that are actually used in frame sync detection may be selected.

For example, the following detection modes are selectable:
mode 1: only detection patterns P1, P6, and P7 are used;
mode 2: only detection patterns P1, P2, P3, P6, and P7 are used;
mode 3: detection patterns P1 to P7 are used;
mode 4: detection patterns P1 to P9 are used;
mode 5: all detection patterns P1 to P11 are used;
mode 6: detection patterns other than detection patterns P2 to P5 are used; and
mode 7: only detection pattern P1 is used.

This is only an example. Each detection pattern is selectable. For example, a disc drive apparatus manufacturer may selectively set an appropriate mode in an adjustment stage prior to shipment. Alternatively, detection modes may be selected on a user side.

It may be said that appropriateness of which detection mode is to be used should be considered on the basis of a balance between frame sync detection capability and reduced false detection. For example, if it is necessary to preferentially improve the frame sync detection capability, those up to low security level detection patterns as in modes 4 and 5 may be used. In addition, if it is necessary to preferentially reduce false detection, only high security level detection patterns as in modes 1, 2, and 3 may be used.

Furthermore, to cope with special circumstances, modes 6 and 7 are set to be selectable.

By employing the above settings, the flexibility of the frame sync detecting operation can be enhanced.

In addition, it is also possible that the above detection modes can automatically be switched on the basis of an operating status.

For example, if the synchronization-protection/state-control unit 22 takes a time to change to the lock state, or immediately returns to the open state after changing to the lock state, an operation for switching among the above detection modes is performed in order to enhance the frame sync detecting capability.

In addition, it can be also assumed that, on the basis of an error rate status in the decoding operation by the ENC/DEC 7, the detection modes be switchable.

Furthermore, it is also possible that the detection modes be selected on the basis of the disc 90, which is to be played back, and a type of disc drive apparatus used in past recording to the disc 90. For example, when the disc 90 is loaded, information to be read includes a disc manufacturer, a product type (such as a model number), a manufacturer and model number of a disc drive apparatus used in past recording to the disc 90. By selecting an appropriate detection mode depending on the disc 90 and the disc drive apparatus used in past recording to the disc 90, stable frame sync detection can be performed.

Although the embodiment of the present invention has been described, the present invention is not limited to the above-described embodiment but may be modified within the spirit of the present invention.

A playback apparatus according to an embodiment of the present invention may be either the above-described disc drive apparatus (recording/playback apparatus) or a playback-only apparatus without a recording function.

In addition, an embodiment of the present invention is applicable, as a sync signal detecting method, not only to a playback apparatus for Blu-ray Discs, but also to playback apparatuses for various types of media. In particular, an embodiment of the present invention is applicable to a playback apparatus for playing back information from a recording medium in which, in a data structure including sync signals added in units of data items each having a predetermined size, the information is recorded in runlength limited codes, and the sync signals correspond to a plurality of patterns of consecutive unique run lengths unique to the sync signals.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus for playing back information from a recording medium having a data structure including sync signals added in units of data items each having a predetermined size, the information being recorded in runlength limited codes, the sync signals corresponding to a plurality of patterns of consecutive unique run lengths unique to the sync signals, the playback apparatus comprising:
    an information reading unit that obtains a binary data string as read information by reading the recording medium;
    a sync detection unit that performs detection of sync signals from the binary data string; and
    a data demodulation unit that obtains played-back data from the recording medium by performing demodulation on the binary data string with timing based on the sync signals detected by the sync detection unit,
    wherein, on the basis of detection, from the binary data string, of one detection pattern among a plurality of types of detection patterns set as patterns including at least one of the plurality of patterns of consecutive unique run lengths, the sync detection unit regards the detection of the detection pattern as the detection of the sync signals.

2. The playback apparatus according to claim 1, wherein, when the detected sync signals correspond to a pattern of two consecutive unique run lengths among the plurality of patterns of consecutive unique run lengths, the plurality of types of detection patterns include a detection pattern in which one of the two consecutive unique run lengths is not one of the plurality of patterns of consecutive unique run lengths.

3. The playback apparatus according to claim 1, wherein, when one of the plurality of patterns of consecutive unique run lengths is represented by nT and the detected sync signals correspond to a pattern represented by nTnT, where T represents a channel clock period, the plurality of types of detection patterns include a pattern represented by nTuTvTwT and a pattern represented by uTvTwTnT, where u+v+w=n.

4. The playback apparatus according to claim 1, wherein, when information of run lengths represented by 2T to 8T as the runlength limited codes is recorded on the recording medium, and the detected sync signals correspond to a pattern of unique run lengths represented by 9T9T, where T represents a channel clock period, the plurality of types of detection patterns include a pattern represented by 9TuTvTwT and a pattern represented by uTvTwT9T, where u+v+w=9.

5. The playback apparatus according to claim 1, wherein the information reading unit obtains the binary data string by performing partial response maximum likelihood decoding on a signal obtained by reading the recording medium.

6. The playback apparatus according to claim 1, wherein the sync detection unit selects a detection pattern for use in sync signal detection from the plurality of types of detection patterns.

7. The playback apparatus according to claim 1, wherein:
    the sync signals and sync identification information representing sync signal types are added to all or part of the units of data items on the recording medium; and
    the plurality of types of detection patterns used by the sync detection unit include patterns including the sync identification information.

8. The playback apparatus according to claim 7, wherein, on the basis of a synchronization protection state in sync signal detection, the sync detection unit selects whether to use, among the plurality of types of detection patterns, the patterns including the sync identification information for sync signal detection.

9. A playback method for playing back information from a recording medium having a data structure including sync signals added in units of data items each having a predetermined size, the information being recorded in runlength limited codes, the sync signals corresponding to a plurality of patterns of consecutive unique run lengths unique to the sync signals, the playback method comprising the steps of:

comparing a pattern appearing in a binary data string obtained by reading the recording medium with each of a plurality of types of detection patterns set as patterns including at least one of the plurality of patterns of consecutive unique run lengths; and when matching occurs between the pattern appearing in the binary data string and at least one of the plurality of types of detection patterns, regarding the matching as sync signal detection.

* * * * *